US012372837B2

(12) United States Patent
Koito et al.

(10) Patent No.: US 12,372,837 B2
(45) Date of Patent: Jul. 29, 2025

(54) OPTICAL DEVICE

(71) Applicant: Japan Display Inc., Tokyo (JP)

(72) Inventors: Takeo Koito, Tokyo (JP); Kojiro Ikeda, Tokyo (JP); Tae Kurokawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/381,355

(22) Filed: Oct. 18, 2023

(65) Prior Publication Data

US 2024/0045276 A1 Feb. 8, 2024

Related U.S. Application Data

(63) Continuation of application No. PCT/JP2022/019176, filed on Apr. 27, 2022.

(30) Foreign Application Priority Data

Apr. 28, 2021 (JP) ................................. 2021-076824

(51) Int. Cl.
*G02F 1/1347* (2006.01)
*G02F 1/1333* (2006.01)
(Continued)

(52) U.S. Cl.
CPC ...... *G02F 1/1347* (2013.01); *G02F 1/133368* (2021.01); *G02F 1/1337* (2013.01); *G02F 1/1343* (2013.01)

(58) Field of Classification Search
None
See application file for complete search history.

(56) References Cited

U.S. PATENT DOCUMENTS 8,233,125 B2 * 7/2012 Yuh .................. G02F 1/134363
349/141
8,842,240 B2 * 9/2014 Arai ...................... G02F 1/1347
349/113

(Continued)

FOREIGN PATENT DOCUMENTS

JP 2010-525388 A 7/2010

OTHER PUBLICATIONS

International Search Report issued in International Patent Application No. PCT/JP2022/019176 on Jul. 26, 2022 and English translation of same. 6 pages.

(Continued)

*Primary Examiner* — Dung T Nguyen
(74) *Attorney, Agent, or Firm* — K&L Gates LLP

(57) ABSTRACT

An optical device comprises a first liquid crystal cell, a second liquid crystal cell overlapped with the first liquid crystal cell. Each of the first liquid crystal cell and the second liquid crystal cell includes a first substrate arranged with a first electrode extending in a direction inclined at a predetermined angle with respect to a first direction, a second substrate arranged with a second electrode extending in a direction inclined at a predetermined angle with respect to a second direction, and a liquid crystal layer. An extension direction of the first electrode and an that of the second electrode intersect each other without being perpendicular. The extension directions of the first electrode and the second electrode in the first liquid crystal cell and that of the first electrode and the second electrode in the second liquid crystal cell are different from each other.

15 Claims, 21 Drawing Sheets

(51) Int. Cl.
    *G02F 1/1337*     (2006.01)
    *G02F 1/1343*     (2006.01)

(56) References Cited

U.S. PATENT DOCUMENTS

| | | | |
|---|---|---|---|
| 9,058,782 B2 * | 6/2015 | Fan | G09G 3/3607 |
| 2010/0149444 A1 | 6/2010 | Hikmet et al. | |
| 2011/0059670 A1 * | 3/2011 | Jin | G02F 1/1323 |
| | | | 445/24 |
| 2018/0196318 A1 | 7/2018 | Presniakov et al. | |

OTHER PUBLICATIONS

Written Opinion issued in International Patent Application No. PCT/JP2022/019176 on Jul. 26, 2022. 4 pages.

English translation of Office Action issued in related Japanese Patent Application No. 2023-517608, mailed on Nov. 12, 2024. 5 pages.

Extended European Search Report issued in related EP Patent Application No. 22795871.7, dated Apr. 28, 2025. 10 pages.

* cited by examiner

OPTICAL DEVICE

CROSS-REFERENCE TO RELATED APPLICATIONS

This application is a Continuation of International Patent Application No. PCT/JP2022/019176, filed on Apr. 27, 2022, which claims the benefit of priority to Japanese Patent Application No. 2021-076824, filed on Apr. 28, 2021, the entire contents of which are incorporated herein by reference.

FIELD

An embodiment of the present disclosure relates to a device for controlling light distribution of light emitted from a light source using an electro-optical function of a liquid crystal.

BACKGROUND

A technique for controlling light distribution of light emitted from a light source using a liquid crystal lens are known. For example, U.S. Patent Application Publication No. 2018/0196318 discloses an illumination device that controls a light distribution angle by controlling alignment of liquid crystals.

SUMMARY

An optical device according to an embodiment of the present disclosure includes a first liquid crystal cell and a second liquid crystal cell overlap the first liquid crystal cell, each of the first liquid crystal cell and the second liquid crystal cell includes a first substrate arranged with a first electrode having a first pattern extending in a direction inclined at a predetermined angle with respect to a first direction, a second substrate arranged with a second electrode having a second pattern extending in a direction inclined at a predetermined angle with respect to a second direction perpendicular to the first direction, a liquid crystal layer between the first substrate and the second substrate, an extension direction of the first pattern of the first electrode and an extension direction of the second pattern of the second electrode intersect each other without being perpendicular, the first substrate and the second substrate are arranged with the first electrode and the second electrode facing each other, and the extension directions of the first patterns in the first liquid crystal cell and the second liquid crystal cell are different from each other, and the extension directions of the second patterns in the first liquid crystal cell and the second liquid crystal cell are different from each other.

An optical device according to an embodiment of the present disclosure includes a first liquid crystal cell and a second liquid crystal cell overlap the first liquid crystal cell, each of the first liquid crystal cell and the second liquid crystal cell includes a first substrate arranged with a plurality of first electrodes having a first pattern having a first bending point, a second substrate arranged with a plurality of second electrodes having a second pattern having a second bending point and a liquid crystal layer between the first substrate and the second substrate, in the plurality of first electrodes, an arrangement direction of first bending points is inclined at a predetermined angle with respect to a first direction, in the plurality of second electrodes, an arrangement direction of second bend points is inclined at a predetermined angle with respect to a second direction perpendicular to the first direction, the arrangement direction of the first bending points and the arrangement direction of the second bending points intersect without being perpendicular, the first substrate and the second substrate are arranged with the first electrode and the second electrode facing each other, and the arrangement directions of the first bend points in the first liquid crystal cell and the second liquid crystal cell are different from each other, and the arrangement directions of the second bend points in the first liquid crystal cell and the second liquid crystal cell are different from each other.

DESCRIPTION OF EMBODIMENTS

Figure 1:
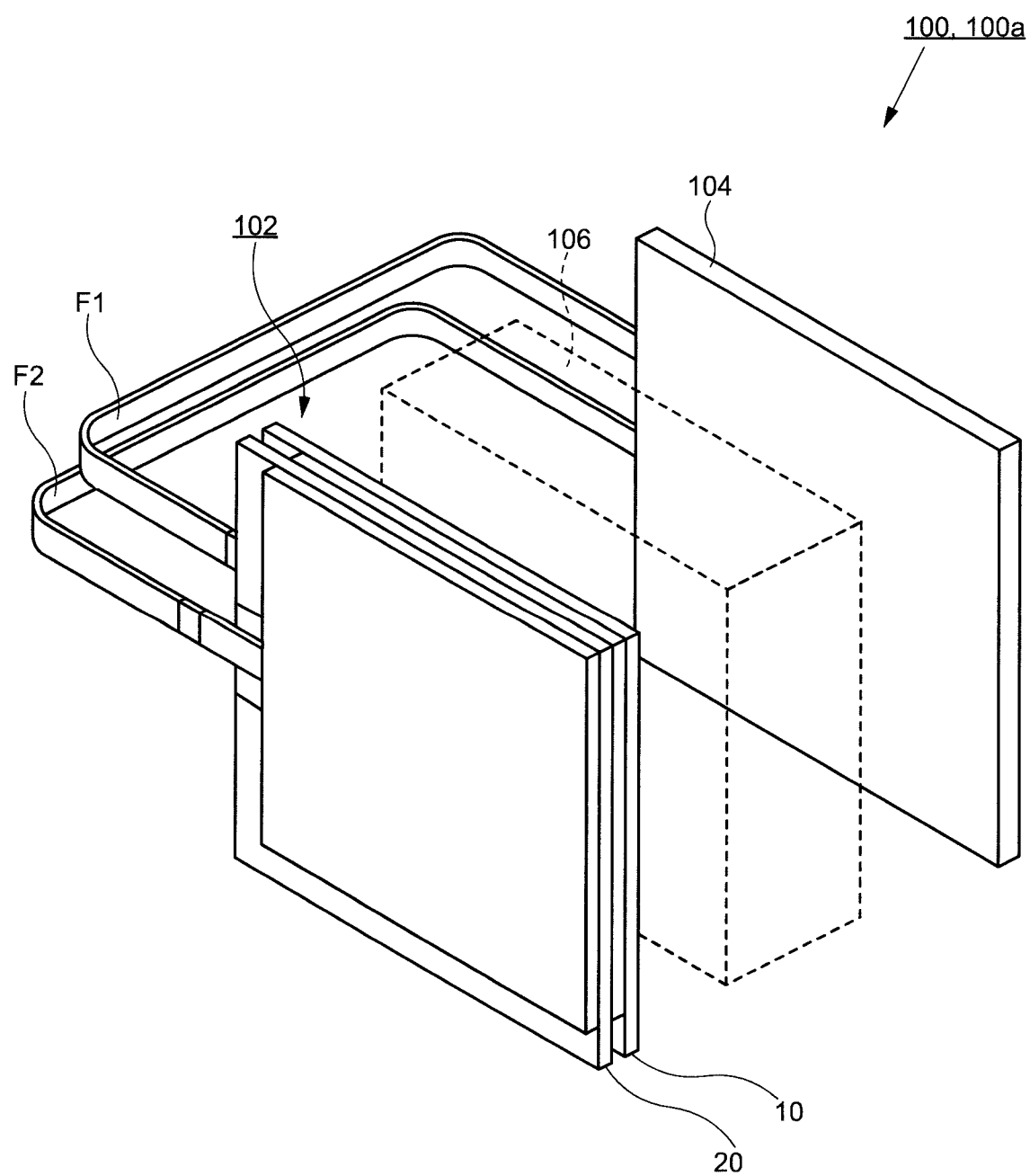
FIG. 1 is a perspective view schematically showing a configuration of an optical device according to an embodiment of the present disclosure.

Hereinafter, embodiments of the present disclosure will be described with reference to the drawings and the like. However, the present disclosure can be implemented in many different aspects, and should not be construed as being limited to descriptions of the embodiments exemplified below. In some cases, the width, thickness, shape, and the like of each part in the drawings are schematically represented in comparison with the actual embodiments in order to clarify the description, but the drawings are merely examples and do not limit the interpretation of the present invention. In addition, in the present specification and the drawings, the same reference signs (or reference signs denoted by a, b, and the like) are given to the same elements as those described above with respect to the previous drawings, and detailed description thereof may be omitted as appropriate. Furthermore, the terms "first" and "second" with respect to each of elements are convenient signs used to distinguish the respective elements, and do not have any further meaning unless otherwise specified.

As used herein, in the case where a member or region is referred to as being "above (or below)" another member or region, this includes not only the case where it is directly above (or directly below) the other member or region, but also the case where it is above (or below) the other member or region, that is, the case where another component is included between the other member or region unless otherwise limited.

First Embodiment

FIG. 1 shows a perspective view of an optical device 100 according to an embodiment of the present disclosure. The optical device 100 includes a liquid crystal optical element 102 and a circuit board 104. The liquid crystal optical element 102 includes a plurality of liquid crystal cells. In the present embodiment, the liquid crystal optical element 102 includes at least two liquid crystal cells.

FIG. 1 shows an embodiment in which the liquid crystal optical element 102 includes a first liquid crystal cell 10 and a second liquid crystal cell 20. The first liquid crystal cell 10 and the second liquid crystal cell 20 are flat panels, and are arranged so that flat surfaces of the respective liquid crystal cells overlap each other. A transparent adhesive layer (not shown) is arranged between the first liquid crystal cell 10 and the second liquid crystal cell 20. The liquid crystal optical element 102 has a structure in which liquid crystal cells arranged adjacent to each other are bonded to each other with a transparent adhesive layer.

The circuit board 104 includes a circuit for driving the liquid crystal optical element 102. The first liquid crystal cell 10 is connected to the circuit board 104 via a first flexible circuit board F1, and the second liquid crystal cell 20 is connected to the circuit board 104 via a second flexible circuit board F2. The circuit board 104 outputs a control signal for controlling an alignment state of a liquid crystal via the flexible circuit board to each of the liquid crystal cells.

In the optical device 100 shown in FIG. 1, a light source unit 106 is arranged on a back side of the liquid crystal optical element 102. The optical device 100 is configured such that light emitted from the light source unit 106 is emitted to the front side of the drawing through the liquid crystal optical element 102. In the liquid crystal optical element 102, the first liquid crystal cell 10 and the second liquid crystal cell 20 are arranged in this order from a side of the light source unit 106.

The light source unit 106 includes a white light source, and an optical element such as a lens may be arranged between the white light source and the liquid crystal optical element 102 as necessary. The white light source is a light source that emits light close to natural light, and may emit dimmed light, such as daylight white or light bulb color. The optical device 100 has a function of controlling a diffusion direction of the light emitted from the light source unit 106 by the liquid crystal optical element 102. The liquid crystal optical element 102 has a function of forming the light emitted from the light source unit 106 into a light distribution pattern of a square shape, a cross shape, a line shape, or the like.

Figure 2:
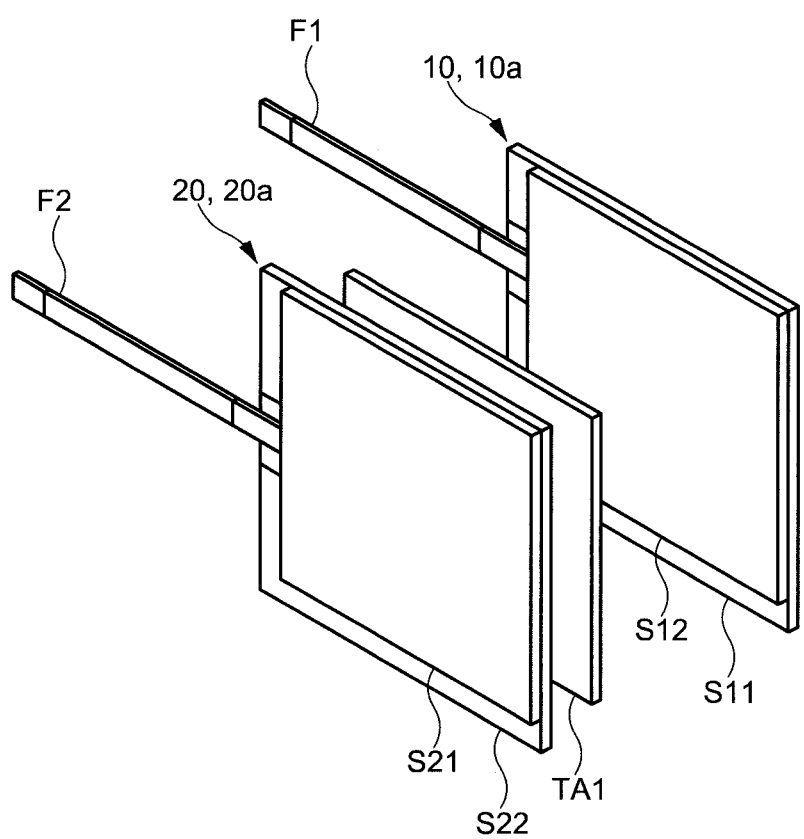
FIG. 2 shows an exploded view of a liquid crystal optical element constituting an optical device according to an embodiment of the present disclosure.

FIG. 2 shows an exploded view of the liquid crystal optical element 102 shown in FIG. 1. The liquid crystal optical element 102 includes the first liquid crystal cell 10 and the second liquid crystal cell 20.

The first liquid crystal cell 10 includes a first substrate S11, a second substrate S12, and the first flexible circuit board F1. The first substrate S11 and the second substrate S12 are arranged to face each other with a gap therebetween. A liquid crystal layer, which is not shown, is arranged in the gap between the first substrate S11 and the second substrate S12. The first flexible circuit board F1 is connected to the first substrate S11.

The second liquid crystal cell 20 includes a first substrate S21, a second substrate S22, and the second flexible circuit board F2. The first substrate S21 and the second substrate S22 are arranged to face each other with a gap therebetween. A liquid crystal layer, which is not shown, is arranged in the gap between the first substrate S21 and the second substrate S22. The second flexible circuit board F2 is connected to the first substrate S21.

A first transparent adhesive layer TA1 is arranged between the first liquid crystal cell and the second liquid crystal cell 20. The first transparent adhesive layer TA1 transmit visible light and adhere the second substrate S12 of the first liquid crystal cell 10 with the second substrate S22 of the second liquid crystal cell 20. In other words, the first liquid crystal cell 10 and the second liquid crystal cell 20 are arranged such that the second substrate S12 of the first liquid crystal cell 10 and the second substrate S22 of the second liquid crystal cell 20 face each other via the first transparent adhesive layer TA1.

The first transparent adhesive layer TA1 preferably have a high transmittance and a refractive index close to the first substrates S11 and S21 and the second substrates S12 and S22. As the first transparent adhesive layer TA1, an optically elastic resin can be used, and for example, an adhesive containing a translucent acrylic resin can be used. Further, since temperature of the liquid crystal optical element 102 rises due to a heat radiated from the light source unit 106, a thermal expansion coefficient of the first transparent adhesive layer TA1 is preferably close to a thermal expansion coefficient of the first substrates S11 and S21 and the second substrates S12 and S22.

However, since the thermal expansion coefficient of the first transparent adhesive layer TA1 is often higher than that of a glass substrate, it is necessary to consider stress re laxation when temperature rises. A thickness of the first transparent adhesive layer TA1 is preferably larger than cell gaps (thicknesses of the liquid crystal layers) of the respective liquid crystal cells (the first liquid crystal cell 10 and the second liquid crystal cell 20) in order to reduce thermal stresses when temperature rises.

Figure 3:
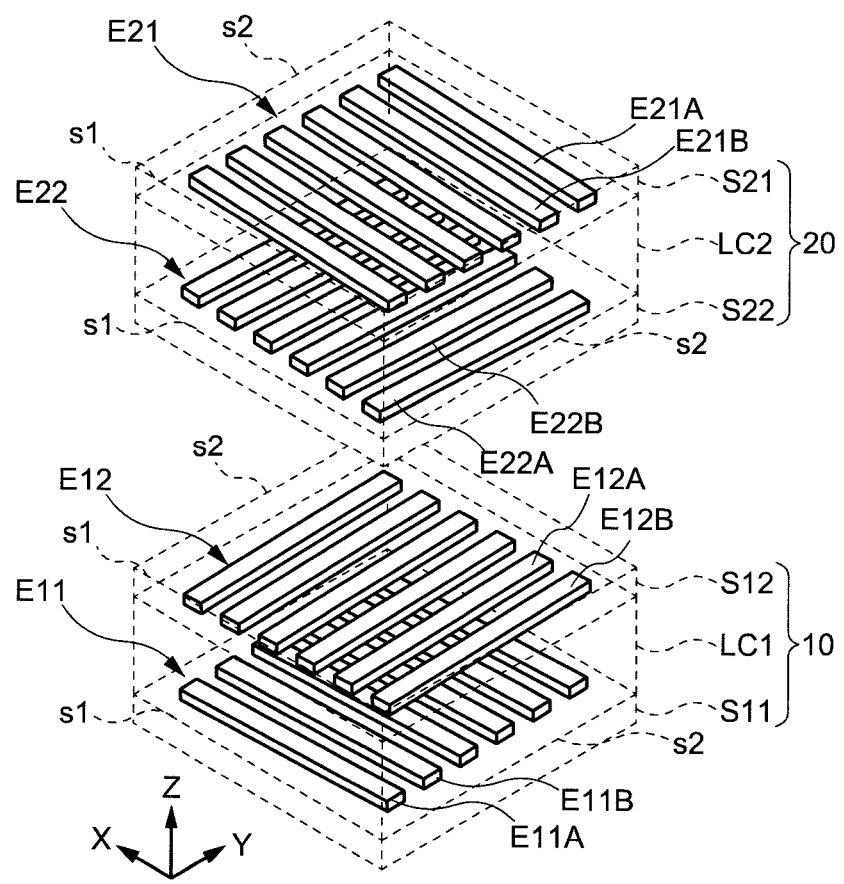
FIG. 3 is a perspective view showing an arrangement of electrodes of a first liquid crystal cell and a second liquid crystal cell constituting a liquid crystal optical element according to an embodiment of the present disclosure.

FIG. 3 is a perspective view showing an arrangement of electrodes arranged in each of the first liquid crystal cell 10 and the second liquid crystal cell 20.

The first liquid crystal cell 10 includes the first substrate S11 and the second substrate S12, and a first liquid crystal layer LC1 between the first substrate S11 and the second substrate S12. Each of the first substrate S11 and the second substrate S12 may have a rectangle shape having a pair of sides (first side s1) parallel to an X-axis direction (first direction) and a pair of sides (second side s2) parallel to a Y-axis direction (second direction) perpendicular to the X-axis direction. The first substrate S11 is arranged with a first electrode E11 on a side facing the first liquid crystal layer LC1, and the second substrate S12 is arranged with a second electrode E12 on a side facing the first liquid crystal layer LC1. The first electrode E11 and the second electrode E12 are arranged to face each other with the first liquid crystal layers LC1 interposed therebetween.

The first electrode E11 includes a plurality of first branch electrodes E11A and a plurality of second branch electrodes E11B each including a first pattern linearly extending in a direction inclined by a predetermined angle with respect to the X-axis direction (first direction). Extension directions of the plurality of first branch electrodes E11A and the plurality of second branch electrodes 11B may be inclined by $0.5\pm1°$ or more and $10\pm1°$ or less with respect to the X-axis direction.

Preferably, the plurality of first branch electrodes E11A and the plurality of second branch electrodes E11B may be inclined by $0.5\pm1°$ or more and $5\pm1°$ or less with respect to the X-axis. The second electrode E12 includes a plurality of third branch electrodes E12A and a plurality of fourth branch electrodes E12B including a second pattern linearly extending in a direction inclined by a predetermined angle with respect to the Y-axis direction (second direction). Extension directions of the plurality of third branch electrodes E12A and the plurality of fourth branch electrodes E12B may be inclined by $0.5\pm1°$ or more and $10\pm1°$ or less with respect to the Y-axis direction. Preferably, the plurality of third branch electrodes E12A and the plurality of fourth branch electrodes E12B may be inclined by $0.5\pm1°$ or more and $5\pm1°$ or less with respect to the Y-axis. The plurality of first branch electrodes E11A and the plurality of second branch electrodes E11B are alternately arranged in the Y-axis direction, and the plurality of third branch electrodes E12A and the plurality of fourth branch electrodes E12B are alternately arranged in the X-axis direction.

In FIG. 3, X, Y, and Z-axis directions are shown for a purpose of explanation. The first liquid crystal cell 10 and the second liquid crystal cell 20 are arranged so as to overlap each other in the Z-axis direction. As described above, in the first liquid crystal cell 10, extension directions of the plurality of first branch electrodes E11A and the plurality of second branch electrodes E11B are inclined at a predetermined angle with respect to the X-axis direction, and extension directions of the plurality of third branch electrodes E12A and the plurality of fourth branch electrodes E12B are inclined at a predetermined angle with respect to the Y-axis direction. That is, the plurality of first branch electrodes E11A and the plurality of second branch electrodes E11B and the plurality of third branch electrodes E12A and the plurality of fourth branch electrodes E12B are arranged to intersect each other so as not to be perpendicular to each other.

The second liquid crystal cell 20 includes the first substrate S21 and the second substrate S22, and a second liquid crystal layer LC2 between the first substrate S21 and the second substrate S22. The first substrate S21 is arranged with a first electrode E21 on a side facing the second liquid crystal layer LC2, and the second substrate S22 is arranged with a second electrode E22 on a side facing the second liquid crystal layer LC2. The first electrode E21 includes a plurality of first branch electrodes E21A and a plurality of second branch electrodes E21B including a first pattern linearly extending in a direction inclined by a predetermined angle with respect to the X-axis direction (first direction).

Extension directions of the plurality of first branch electrodes E21A and the plurality of second branch electrodes E21B may be inclined by 0.5±1° or more and 10±1° or less with respect to the X-axis direction. Preferably, the plurality of first branch electrodes E21A and the plurality of second branch electrodes E21B may be inclined by 0.5±1° or more and 5±1° or less with respect to the X-axis. The second electrode E22 includes a plurality of third branch electrodes E22A and a plurality of fourth branch electrodes E22B including a second pattern linearly extending in a direction inclined by a predetermined angle with respect to the Y-axis direction (second direction). Extension directions of the plurality of third branch electrodes E22A and the plurality of fourth branch electrodes E22B may be inclined by 0.5±1° or more and 10±1° or less with respect to the Y-axis direction. Preferably, the plurality of third branch electrodes E22A and the plurality of fourth branch electrodes E22B may be inclined by 0.5±1° or more and 5±1° or less with respect to the Y-axis.

In the second liquid crystal cell 20, the plurality of first branch electrodes E21A and the plurality of second branch electrodes E21B are alternately arranged in the Y-axis direction, and the plurality of third branch electrodes E22A and the plurality of fourth branch electrodes E22B are alternately arranged in the X-axis direction. As described above, in the second liquid crystal cell 20, extension directions of the plurality of first branch electrodes E21A and the plurality of second branch electrodes E21B are inclined at a predetermined angle with respect to the X-axis direction, and extension directions of the plurality of third branch electrodes E22A and the plurality of fourth branch electrodes E22B are inclined at a predetermined angle with respect to the Y-axis direction. That is, the plurality of first branch electrodes E21A and the plurality of second branch electrodes E21B and the plurality of third branch electrodes E22A and the plurality of fourth branch electrodes E22B are arranged to intersect each other so as not to be perpendicular to each other.

In the liquid crystal optical element 102, the first branch electrodes E11A and the second branch electrodes E11B of the first liquid crystal cell 10 and the first branch electrodes E21A and the second branch electrodes E21B of the second liquid crystal cell 20 are respectively extended and inclined at a predetermined angle with respect to the X-axis. Similarly, in the liquid crystal optical element 102, the third branch electrodes E12A and the fourth branch electrodes E12B of the first liquid crystal cell 10 and the third branch electrodes E22A and the fourth branch electrodes E22B of the second liquid crystal cell 20 are respectively extended and inclined at a predetermined angle with respect to the Y-axis.

In the liquid crystal optical element 102, the second substrate S12 of the first liquid crystal cell 10 and the second substrate S22 of the second liquid crystal cell 20 are arranged so as to face each other via the first transparent adhesive layer TA1 not shown in FIG. 3. In other words, the third branch electrode E12A and the fourth branch electrode E12B of the first liquid crystal cell 10 are arranged so as to face the third branch electrodes E22A and the fourth branch electrodes E22B of the second liquid crystal cell 20. Therefore, in the liquid crystal optical element 102, in the state where the first liquid crystal cell 10 and the second liquid crystal cell 20 are overlapped, in the case where the third branch electrodes E12A and the fourth branch electrodes E12B of the first liquid crystal cell 10 are arranged at a predetermined angle, for example, at an angle $\theta_2$ inclination with respect to the Y-axis direction, the third branch electrodes E22A and the fourth branch electrodes E22B of the second liquid crystal cell 20 are arranged at an angle 180-$\theta_2$ inclination with respect to the Y-axis direction. The angle $\theta_2$ is 0.5±1° or more and 10±1° or less.

Further, in the liquid crystal optical element 102, the first substrate S11 of the first liquid crystal cell 10 and the first substrate S21 of the second liquid crystal cell 20 are arranged so as to face each other via the liquid crystal layer LC1 of the first liquid crystal cell 10, the second substrate S12 of the first liquid crystal cell 10, the first transparent adhesive layer TA1 not shown in FIG. 3, the second substrate S22 of the second liquid crystal cell 20, and the liquid crystal layer LC2 of the second liquid crystal cell 20. In other words, the first branch electrodes E11A and the second branch electrodes E11B of the first liquid crystal cell 10 are arranged so as to face the first branch electrodes E21A and the second branch electrodes E21B of the second liquid crystal cell 20. Therefore, in the liquid crystal optical element 102, in the state where the first liquid crystal cell 10 and the second liquid crystal cell 20 are overlapped, in the case where the first branch electrodes E11A and the second branch electrodes E11B of the first liquid crystal cell 10 are arranged to be inclined at a predetermined angle, for example, an angle $\theta_1$, with respect to the X-axis direction, the first branch electrodes E21A and the second branch electrodes E21B of the second liquid crystal cell 20 are arranged to be inclined at an angle 180-$\theta_1$ with respect to the X-axis direction. The angle $\theta_1$ is 0.5±1° or more and 10±1° or less.

In the first liquid crystal cell 10 and the second liquid crystal cell 20, the first substrates S11 and S21 have the same configuration, and the second substrates S12 and S22 have the same configuration. The first electrode E11 and the second electrode E12 arranged in the first liquid crystal cell 10 and the first electrode E21 and the second electrode E22 arranged in the second liquid crystal cell 20 have substantially the same size in a plan view. Although not shown in FIG. 3, the light source unit (106) is arranged on a lower side of the first liquid crystal cell 10. The light emitted from the light source unit (106) and incident on the liquid crystal optical element 102 passes through all of the first liquid crystal cell 10 and the second liquid crystal cell 20 to be emitted.

Although the first liquid crystal cell 10 and the second liquid crystal cell 20 have substantially the same configuration, the first liquid crystal cell 10 will be described in more detail.

Figure 4A:
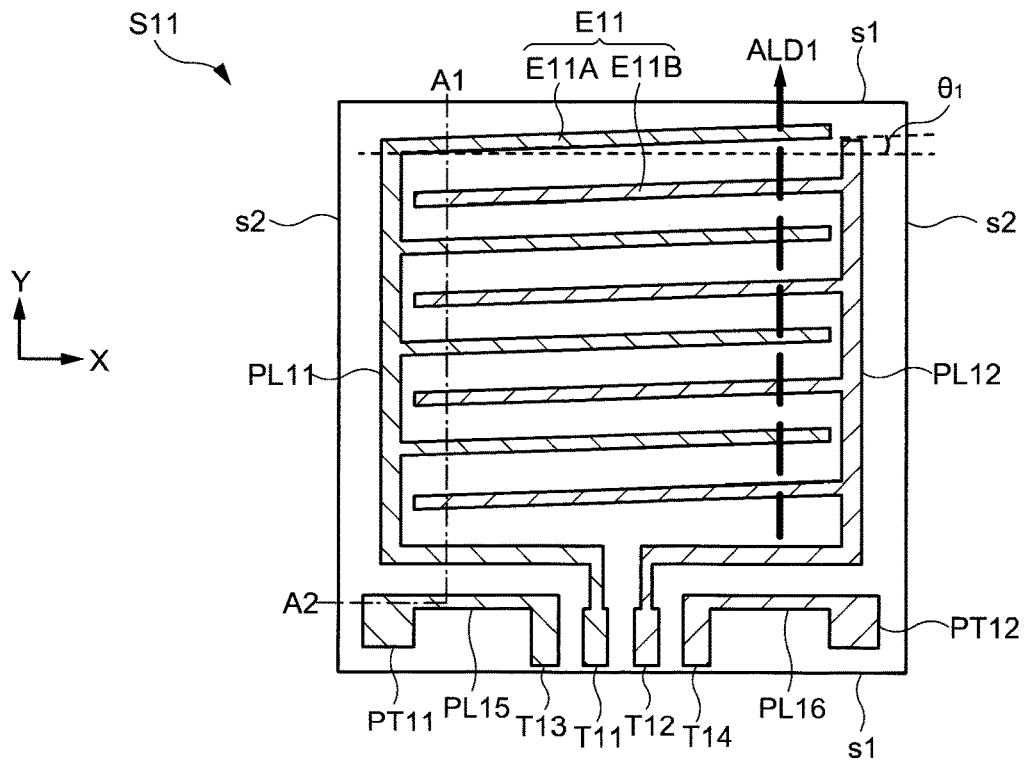
FIG. 4A is a plan view of a first substrate of a liquid crystal cell constituting a liquid crystal optical element according to an embodiment of the present disclosure.
Figure 4B:
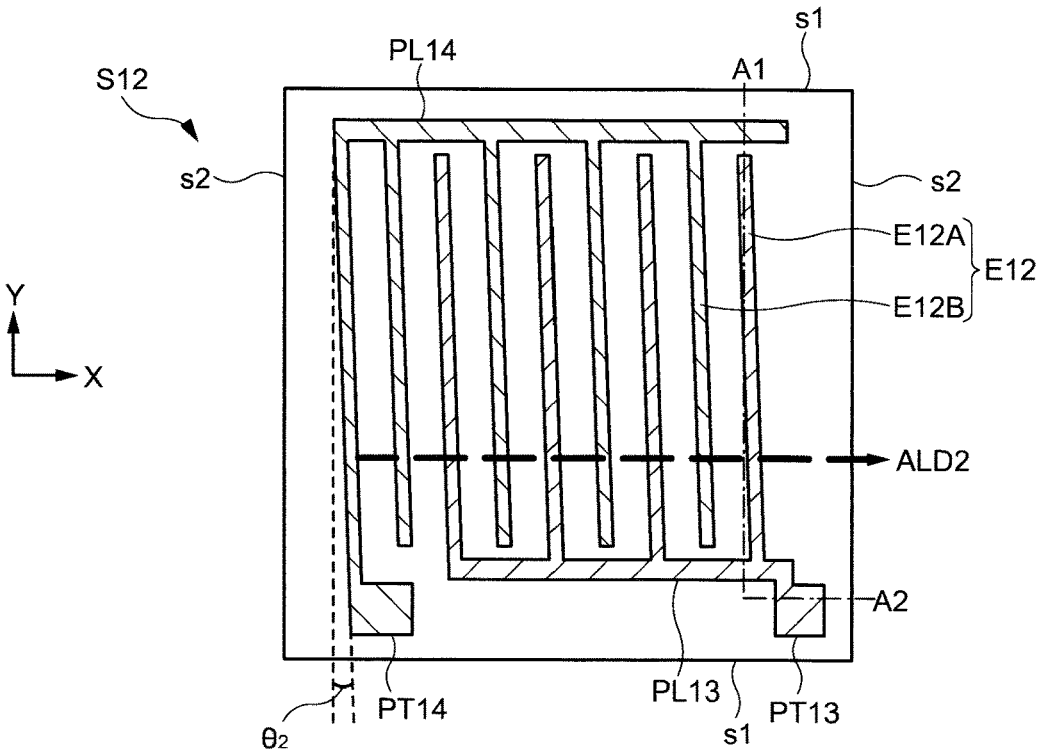
FIG. 4B is a plan view of a second substrate of a liquid crystal cell constituting a liquid crystal optical element according to an embodiment of the present disclosure.

FIG. 4A shows a plan view of the first substrate S11, and FIG. 4B shows a plan view of the second substrate S12.

As shown in FIG. 4A, the first substrate S11 is arranged with the first electrode E11. The first electrode E11 includes the plurality of first branch electrodes E11A and the plurality of second branch electrodes E11B. The plurality of first branch electrodes E11A and the plurality of second branch electrodes E11B have a first pattern, and the first pattern has a striped shape. The first pattern is extended and inclined by the predetermined angle $\theta_1$ with respect to the X-axis direction. The strip-shaped pattern of the plurality of first branch electrodes E11A and the strip-shaped pattern of the plurality of second branch electrodes E11B are alternately arranged at a predetermined interval.

Each of the plurality of first branch electrodes E11A is connected to a first power line PL11, and each of the plurality of second branch electrodes E11B is connected to a second power line PL12. The first power line PL11 is connected to a first connection terminal T11, and the second power line PL12 is connected to a second connection terminal T12. The first connection terminal T11 and the second connection terminal T12 are arranged along one side of an end portion of the first substrate S11. In the first substrate S11, a third connection terminal T13 is arranged adjacent to the first connection terminal T11, and a fourth connection terminal T14 is arranged adjacent to the second connection terminal T12. The third connecting terminal T13 is connected to a fifth power line PL15. The fifth power line PL15 is connected to a first power supply terminal PT11 arranged at a predetermined position in a plane of the first substrate S11. The fourth connecting terminal T14 is connected to a sixth power line PL16. The sixth power line PL16 is connected to a second power supply terminal PT12 arranged at a predetermined position in the plane of the first substrate S11.

The plurality of first branch electrodes E11A are connected to the first power line PL11, and the same voltage is applied to each of the first branch electrodes. The plurality of second branch electrodes E11B are connected to the second power line PL12, and the same voltages are applied to the plurality of second branch electrodes. As shown in FIG. 4A, the plurality of first branch electrodes E11A and the plurality of second branch electrodes E11B are alternately arranged. The plurality of first branch electrodes E11A and the plurality of second branch electrodes E11B are electrically isolated from each other. When different-level voltages are applied to the plurality of first branch electrodes E11A and the plurality of second branch electrodes E11B, an electric field is generated between the electrodes due to a potential difference. That is, a lateral electric field is generated by the plurality of first branch electrodes E11A and the plurality of second branch electrodes E11B.

As shown in FIG. 4B, the second substrate S12 is arranged with the second electrode E12. The second electrode E12 includes the plurality of third branch electrodes E12A and the plurality of fourth branch electrodes E12B. The plurality of third branch electrodes E12A and the plurality of fourth branch electrodes E12B have a second pattern, and the second pattern has a striped shape. The second pattern is extended and inclined by the predetermined angle $\theta_2$ with respect to the Y-axis direction. The strip-shaped patterns of the third branch electrodes E12A and the strip-shaped patterns of the fourth branch electrodes E12B are alternately arranged at a predetermined interval.

Each of the plurality of third branch electrodes E12A is connected to a third power line PL13, and each of the plurality of fourth branch electrodes E12B is connected to a fourth power line PL14. The third power line PL13 is connected to a third power supply terminal PT13, and the fourth power line PL14 is connected to a fourth power supply terminal PT14. The third power supply terminal PT13 is arranged at a position corresponding to the first power supply terminal PT11 of the first substrate S11, and the fourth power supply terminal PT14 is arranged at a position corresponding to the second power supply terminal PT12 of the first substrate S11.

The plurality of third branch electrodes E12A are connected to the third power line PL13, and the same voltage is applied to each of the third branch electrodes. The plurality of fourth branch electrodes E12B are connected to the fourth power line PL14, and the same voltages are applied to the plurality of fourth branch electrodes. As shown in FIG. 4B, the plurality of third branch electrodes E12A and the plurality of fourth branch electrodes E12B are alternately arranged. The plurality of third branch electrodes E12A and the plurality of fourth branch electrodes E12B are electrically isolated from each other. When different-level voltages are applied to the plurality of third branch electrodes E12A and the plurality of fourth branch electrodes E12B, an electric field is generated between the electrodes due to a potential difference. That is, a lateral electric field is generated by the plurality of third branch electrodes E12A and the plurality of fourth branch electrodes E12B.

The first connection terminal T11, the second connection terminal T12, the third connection terminal T13, and the fourth connection terminal T14 arranged on the first substrate S11 are terminals connected to a flexible circuit board. In the first liquid crystal cell 10, the first power supply terminal PT11 and the third power supply terminal PT13 are electrically connected by a conductive material, and the second power supply terminal PT12 and the fourth power supply terminal PT14 are electrically connected by the conductive material.

Figure 5:
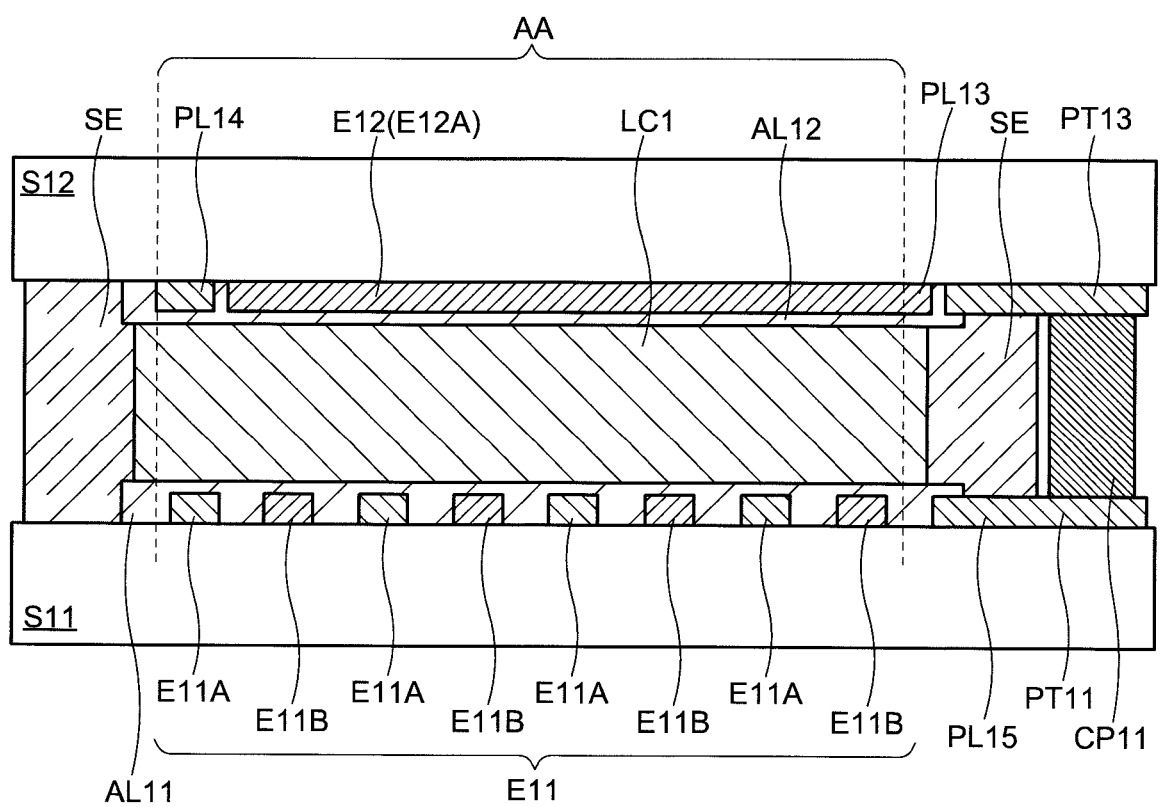
FIG. 5 is a diagram showing an example of a cross-sectional structure of a liquid crystal cell constituting a liquid crystal optical element according to an embodiment of the present disclosure.

FIG. 5 shows a cross-sectional view of the first liquid crystal cell 10. A cross-sectional structure of the first liquid crystal cell 10 shown in FIG. 5 shows a cross-sectional structure corresponding to a line A1-A2 of the first substrate S11 shown in FIG. 4A and the second substrate S12 shown in FIG. 4B.

The first liquid crystal cell 10 has an active region AA capable of polarizing and scattering incident light. The first electrode E11 and the second electrode E12 are arranged in the active region AA. The first substrate S11 and the second substrate S12 are bonded to each other by a sealant SE arranged on an outer side (frame region) of the active region AA. A gap for enclosing the first liquid crystal layer LC1 is arranged between the first substrate S11 and the second substrate S12.

The first liquid crystal layer LC1 is encapsulated between the first substrate S11 and the second substrate S12 by the sealant SE.

The first substrate S11 has a structure with the first electrode E11, the first power supply terminal PT11 and a first alignment film AL11 arranged on the first electrode E11. The first electrode E11 includes the first branch electrodes E11A and the second branch electrodes E11B. The first power supply terminal PT11 is configured to be contiguous with the fifth power line PL15 and is arranged on an outer side of the sealant SE.

The second substrate S12 has a structure with the second electrode E12, the third power supply terminal PT13 and a second alignment film AL12 arranged on the second electrode E12. The second electrode E12 includes the third branch electrodes E12A and the fourth branch electrodes E12B. The third power supply terminal PT13 is configured to be contiguous with the third power line PL13, and is arranged on the outer side of the sealant SE.

The first electrode E11 and the second electrode E12 are arranged such that the extension directions of electrode patterns intersect. That is, the first electrode E11 and the second electrode E12 are arranged such that the extension directions of the first branch electrodes E11A and the second branch electrodes E11B and the extension directions of the third branch electrodes E12A and the fourth branch electrodes E12B intersect. However, the first electrode E11 and the second electrode E12 are not perpendicular to each other. That is, the extension directions of the first branch electrodes E11A and the second branch electrodes E11B are not perpendicular to the extension directions of the third branch electrodes E12A and the fourth branch electrodes E12B.

The first power supply terminal PT11 and the third power supply terminal PT13 face each other and are arranged to face each other in an outer region of the sealant SE. A first conductive member CP11 is arranged between the first power supply terminal PT11 and the third power supply terminal PT13, and electrically connects them. The first conductive member CP11 may be formed of a conductive paste material, and for example, a silver paste or a carbon paste is used.

Although not shown in FIG. 5, the second power supply terminal PT12 and the fourth power supply terminal PT14 are also electrically connected to each other via a conductive member.

The first substrate S11 and the second substrate S12 are light-transmitting substrates, and are, for example, a glass substrate or a resin substrate. The first electrode E11 and the second electrode E12 are transparent electrodes formed of a transparent conductive material such as indium tin oxide (ITO) or indium zinc oxide (IZO).

The power lines (the first power line PL11, the second power line PL12, the third power line PL13, the fourth power line PL14, the fifth power line PL15, the sixth power line PL16), the connection terminals (the first connection terminal T11, the second connection terminal T12, the third connection terminal T13, and the fourth connection terminal T14), and the power supply terminals (the first power supply terminal PT11, the second power supply terminal PT12, the third power supply terminal PT13, and the fourth power supply terminal PT14) are formed of a metallic material such as aluminum, titanium, molybdenum, tungsten, or the like. Alternatively, the power lines (the first power line PL11, the second power line PL12, the third power line PL13, the fourth power line PL14, the fifth power line PL15, and the sixth power line PL16) may be formed of the same transparent conductive film as the first electrode E11 and the second electrode E12.

The alignment film AL11 and AL12 are formed of a horizontally-oriented film having an alignment regulating force substantially parallel to a main plane of the substrate. As the first liquid crystal layer LC1, for example, a twisted nematic liquid crystal (TN (Twisted Nematic) liquid crystal) is used. In addition, although not shown in FIG. 5, spacers may be arranged between the first substrate S11 and the second substrate S12 to keep the distance between substrates constant.

Figure 6:
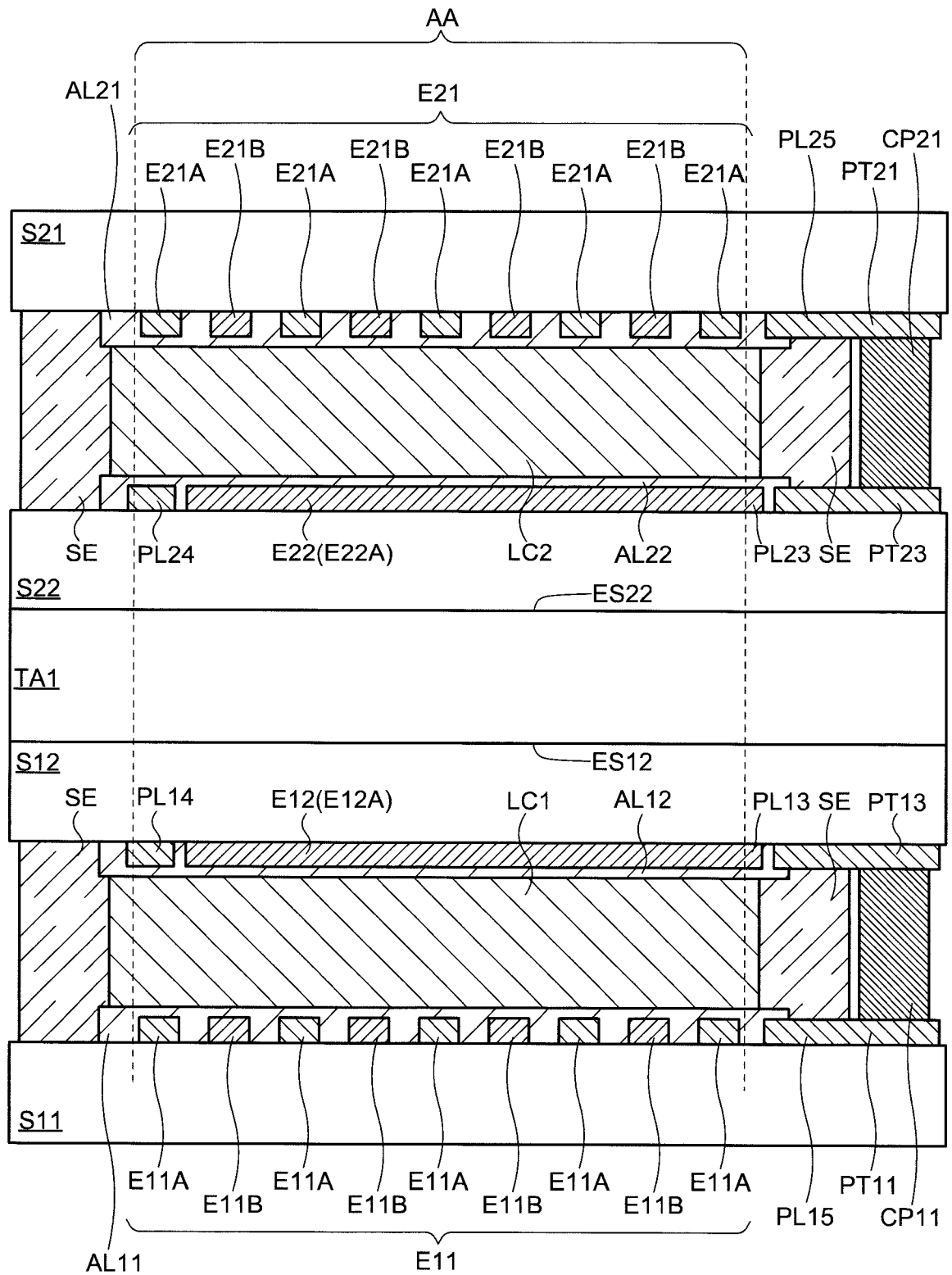
FIG. 6 is a cross-sectional view showing a pattern where two liquid crystal cells constituting a liquid crystal optical element according to an embodiment of the present disclosure are arranged so as to overlap each other.

FIG. 6 is a cross-sectional view of the first liquid crystal cell 10, shown in FIG. 5, and the second liquid crystal cell 20 which is arranged so as to overlap via the first transparent adhesive layer TA1. The cross-sectional structure of the first liquid crystal cell 10 and the second liquid crystal cell 20 shown in FIG. 6 correspond to the cross-sectional structures of the first substrate S11 shown in FIG. 4A and the second substrate S12 shown in FIG. 4B along the line A1-A2.

A configuration of the second liquid crystal cell 20 is substantially the same as the configuration of the first liquid crystal cell 10 described with reference to FIG. 5. The first electrode E21 and the second electrode E22 of the second liquid crystal cell 20 are arranged in the active region AA. The first substrate S21 and the second substrate S22 are bonded to each other by the sealant SE arranged on the outer side of the active region AA. A gap for enclosing the second liquid crystal layer LC2 is arranged between the first substrate S21 and the second substrate S22. The second liquid crystal layer LC2 is encapsulated between the first substrate S21 and the second substrate S22 by the sealant SE.

The second substrate S22 of the second liquid crystal cell 20 has the same configuration as the second substrate S12 of the first liquid crystal cell 10. That is, the second substrate S22 has a structure with the second electrode E22, a third power supply terminal PT23 and the second alignment film AL22 arranged on the second electrode E22. The second electrode E22 includes third branch electrodes E22A and fourth branch electrodes E22B. The third power supply terminal PT23 is configured to be contiguous with the third power line PL23, and is arranged on the outer side of the sealant SE. The second substrate S22 is arranged to face the second substrate S12 of the first liquid crystal cell 10 with the first transparent adhesive layer TA1 interposed therebetween. Specifically, the second substrate S22 is arranged so that a surface (outer surface ES22) opposite to a surface on a side where the second electrode E22 is arranged faces a surface (outer surface E S12) opposite to a surface on a side where the second electrode E12 of the second substrate 12 of the first liquid crystal cell 10 is arranged via the first transparent adhesive layer TA1.

The first substrate S21 of the second liquid crystal cell 20 has the same configuration as the first substrate S11 of the first liquid crystal layer 10. That is, the first substrate S21 has a structure with the first electrode E21, a first power supply terminal PT21 and a first alignment film AL21 arranged on the first electrode E21. The first electrode E21 includes the first branch electrodes E21A and the second branch electrodes E21B. The first power supply terminal PT21 is configured to be contiguous with a fifth power line PL25, and is arranged on the outer side of the sealant SE.

The first electrode E21 and the second electrode E22 are arranged such that extension directions of the electrode patterns intersect. That is, the first electrode E21 and the second electrode E22 are arranged such that extension directions of the first branch electrodes E21A and the second branch electrodes E21B and extension directions of the third branch electrodes E22A and the fourth branch electrodes E22B intersect. However, the first electrode E21 and the second electrode E22 are not perpendicular to each other. That is, the extension directions of the first branch electrodes E21A and the second branch electrodes E21B are not perpendicular to the extension directions of the third branch electrodes E22A and the fourth branch electrodes E22B.

The first power supply terminal PT21 and the third power supply terminal PT23 face each other and are arranged to face each other in the outer region of the sealant SE. A first conductive member CP21 is arranged between the first power supply terminal PT21 and the third power supply terminal PT23, and electrically connects them. The first conductive member CP21 may be formed of the same material as the first conductive member CP11 of the first liquid crystal cell 10. Although not shown in FIG. 6, a second power supply terminal PT22 and a fourth power supply terminal PT24 are also electrically connected to each other via a conductive member.

The first substrate S21 and the second substrate S22 are light-transmitting substrates, and are, for example, a glass substrate or a resin substrate. The first electrode E21 and the second electrode E22 are transparent electrodes formed of a transparent conductive material such as indium tin oxide (ITO) or indium zinc oxide (IZO).

The power lines, the connection terminals, and the power supply terminals arranged on the first substrate S21 and the second substrate S22 of the second liquid crystal cell 20 are formed of a metallic material such as aluminum, titanium, molybdenum, tungsten, and the like, as are the power lines, the connection terminals, and the power supply terminals arranged on the first substrate S11 and the second substrate S12 of the first liquid crystal cell 10. Note that the power lines may be formed of the same transparent conductive film as the first electrode E21 and the second electrode E22.

The alignment films AL21 and AL22 are formed of a horizontally-oriented film having an alignment regulating force substantially parallel to a main plane of the substrate. As the second liquid crystal layer LC2, a twisted nematic liquid crystal (TN (Twisted Nematic) liquid crystal) is used as in the first liquid crystal layer LC1. Although not shown in FIG. 6, spacers may be arranged between the first substrate S21 and the second substrate S22 to keep the distance between the substrates constant.

Figure 7A:
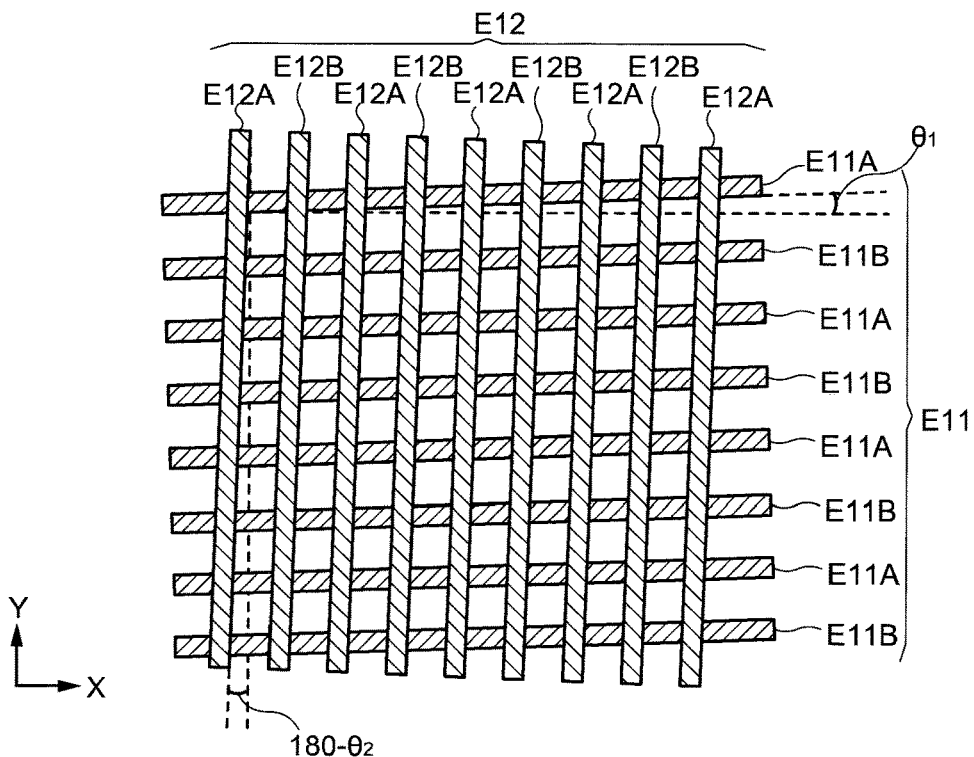
FIG. 7A is a schematic plan view showing a pattern of electrodes arranged in a first liquid crystal cell constituting a liquid crystal optical element according to an embodiment of the present disclosure.
Figure 7B:
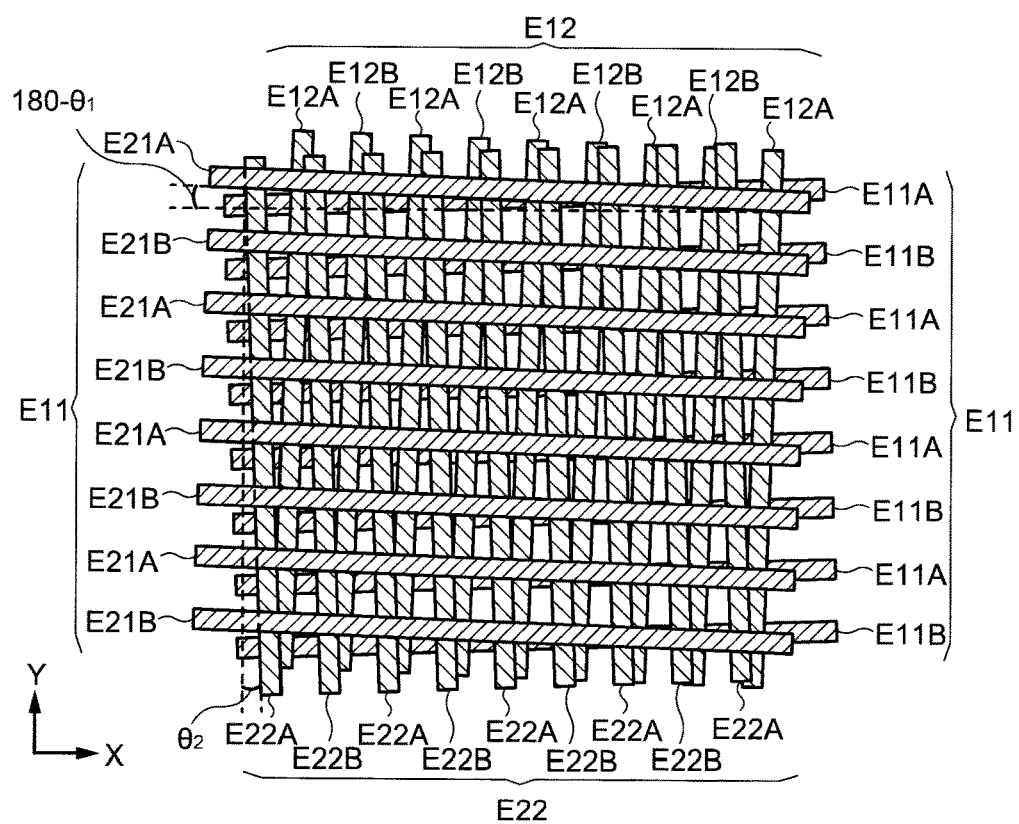
FIG. 7B is a schematic plan view showing a pattern of electrodes respectively arranged in a first liquid crystal cell and a second liquid crystal cell constituting a liquid crystal optical element according to an embodiment of the present disclosure.

FIG. 7A is a schematic plan view showing a pattern (first pattern) of the first electrode E11 and a pattern (second pattern) of the second electrode E12 in the case where the first substrate S11 and the second substrate S12 are arranged so as to overlap each other in the first liquid crystal cell 10. FIG. 7B is a schematic plan view showing the pattern (first pattern) of the first electrodes E11 and E21 and the pattern (second pattern) of the second electrodes E12 and E22 in the case where the first liquid crystal cell 10 and the second liquid crystal cell 20 are arranged so as to overlap each other, that is, in the case where the first substrate S11 and the second substrate S12 of the first liquid crystal cell 10 and the first substrate S21 and the second substrate S22 of the second liquid crystal cell are arranged so as to overlap each other.

As described with respect to FIG. 3 and FIG. 4A, the extension direction of the first electrode E11 (the first branch electrodes E11A and the second branch electrodes E11B) of the first liquid crystal cell 10 is inclined by the angle $\theta_1$ (the angle $\theta_1$ is 0.5±1° or more and 10±1° or less) with respect to the X-axis direction. In the first liquid crystal cell 10, the first substrate S11 and the second substrate S12 are arranged such that the first electrode E11 and the second electrode E12 face each other. That is, the first substrate S11 shown in FIG. 4A and the second substrate S12 are arranged so as to face each other. Therefore, as shown in FIG. 7A, in the first liquid crystal cell 10, when the second substrate S12 overlaps the first substrate S11, the extension direction of the second electrode E12 (the third branch electrodes E12A and the fourth branch electrodes E12B) is inclined by the angle 180-$\theta_2$ (the angle $\theta_2$ is 0.5±1° or more and 10±1° or less) with respect to the Y-axis direction.

As described with reference to FIG. 2, the first liquid crystal cell 10 and the second liquid crystal cell 20 are arranged such that the second substrate S12 of the first liquid crystal cell 10 and the second substrate S22 of the second liquid crystal cell 20 face each other with the first transparent adhesive layer TA1 (not shown in FIG. 7A and FIG. 7B) interposed therebetween. Further, in the case where the first liquid crystal cell 10 and the second liquid crystal cell 20 are arranged so as to overlap each other, the second substrate S22 of the second liquid crystal cell 20 is arranged so that a surface (the outer surface ES22 in FIG. 6) opposite to a surface on which the second electrode E22 is arranged faces a surface (the outer surface ES12 in FIG. 6) opposite to a surface on which the second electrode E12 of the second substrate 12 of the first liquid crystal cell 10 is arranged via the first transparent adhesive layer TA1.

Therefore, as shown in FIG. 7B, when the first liquid crystal cell 10 and the second liquid crystal cell 20 are overlapped, the extension direction of the second electrode E22 (the third branch electrodes E22A and the fourth branch electrodes E22B) of the second liquid crystal cell 20 is inclined by the angle $\theta_2$ (the angle $\theta_2$ is 0.5±1° or more and 10±1° or less) with respect to the Y-axis direction. On the other hand, in the extension direction of the first electrode E21 (the first branch electrodes E21A and the second branch electrodes E21B) is inclined by the angle 180-$\theta_1$ ($\theta_1$ is 0.5±1° or more and 10±1° or less) with respect to the X-axis direction.

As described above, in the present embodiment, in the first liquid crystal cell 10 and the second liquid crystal cell 20, the extension direction of the first electrode E11 and the first electrode 21 is inclined by a predetermined angle with respect to the X-axis direction, and the extension direction of the second electrode E12 and the second electrode E22 is inclined at a predetermined angle with respect to the Y-axis direction. In the first liquid crystal cell 10, the first substrate S11 and the second substrate S12 are arranged such that the first electrode E11 and the second electrode E12 face each other. Further, an arrangement of the first substrate 21 and the second substrate S22 in the second liquid crystal cell 20 is the same as an arrangement of the first substrate S11 and the second substrate S12 in the first liquid crystal cell 10.

In the case where the first liquid crystal cell 10 and the second liquid crystal cell 20 are stacked, the outer surface of the second substrate S22 of the second liquid crystal cell and the outer surface of the second substrate S12 of the first liquid crystal cell 10 are arranged so as to face each other. Further, the extension direction of the first electrode E11 and the first electrode E21 is inclined with respect to the X-axis direction, i.e., the first side s1 of the first substrate S11 and the first substrate S21. Similarly, the extension direction of the second electrode E12 and the second electrode E22 is inclined with respect to the Y-axis direction, i.e., the second side s2 of the second substrate S12 and the second substrate S21. Therefore, as shown in FIG. 7B, the first electrode E11 and the second electrode E12 of the first liquid crystal cell 10 and the first electrode E21 and the second electrode E22 of the second liquid crystal cell overlap each other at least partially shifted from each other. Therefore, interference of light can be prevented, and ripple and luminance unevenness can be reduced. Thus, when the first liquid crystal cell 10 and the second liquid crystal cell 20 are bonded to each other, it is not necessary to adjust the inclination of the cells themselves.

Figure 8A:
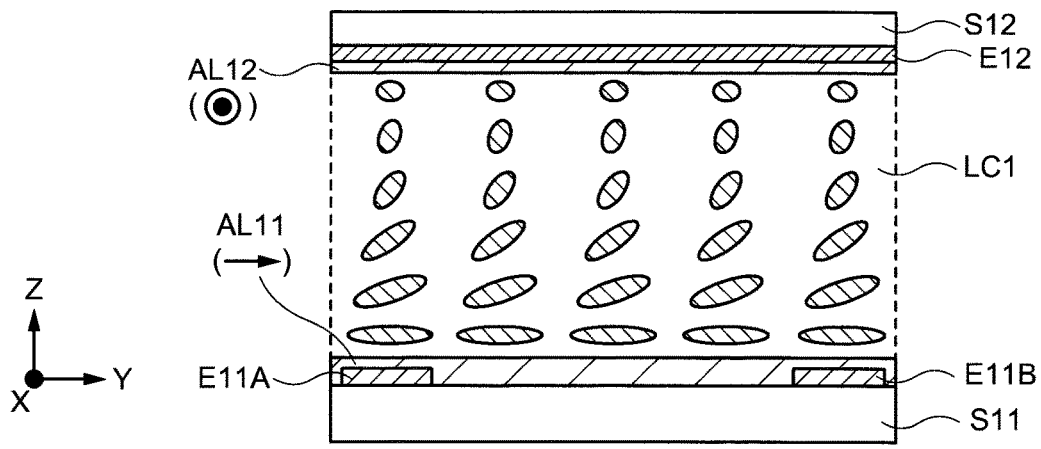
FIG. 8A is a diagram for explaining an operation of a liquid crystal cell constituting a liquid crystal optical element according to an embodiment of the present.
Figure 8B:
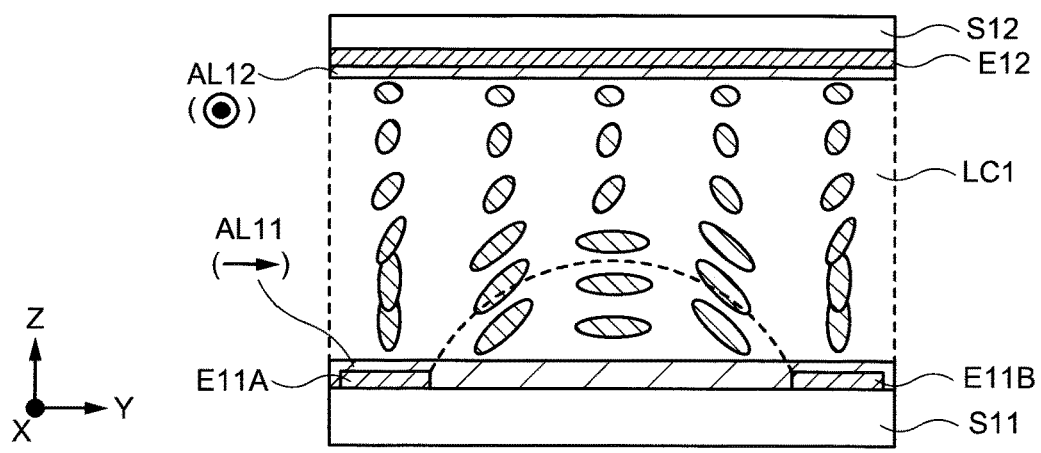
FIG. 8B is a diagram for explaining an operation of a liquid crystal cell constituting a liquid crystal optical element according to an embodiment of the present.
Figure 8C:
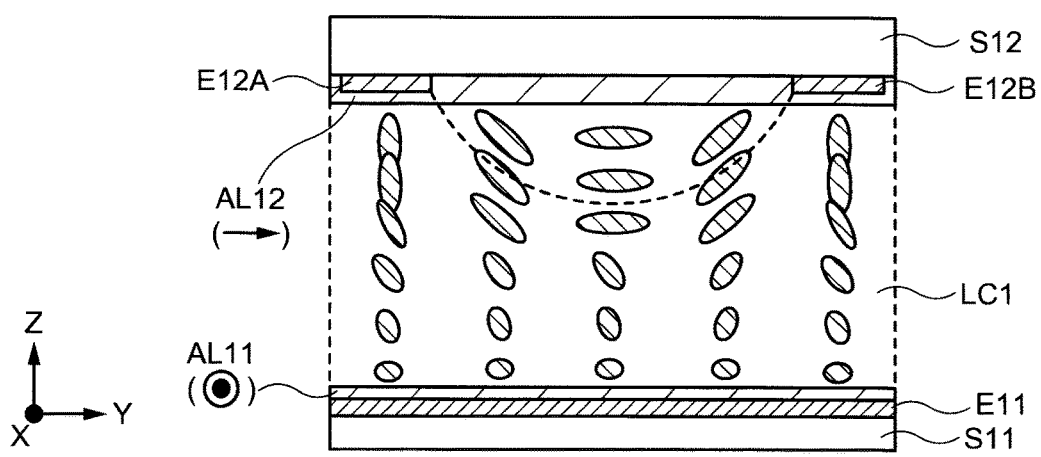
FIG. 8C is a diagram for explaining an operation of a liquid crystal cell constituting a liquid crystal optical element according to an embodiment of the present.

Next, an electro-optical function of the first liquid crystal cell 10 will be briefly described referring to FIG. 8A to FIG. 8C. FIG. 8A to FIG. 8C are schematic cross-sectional views of the first liquid crystal cell 10. In FIG. 8A to FIG. 8C, only configurations required for explanation are shown. FIG. 8A and FIG. 8B are schematic cross-sectional views when the first liquid crystal cell 10 is viewed from the second side s2 of the first substrate S11, and FIG. 8C is a schematic cross-sectional view when the first liquid crystal cell 10 is viewed from the first side s1 of the second substrate S12.

FIG. 8A is a partial schematic cross-sectional view of a first liquid crystal cell 10. FIG. 8A shows the first electrode E11 (the first branch electrodes E11A and the second branch electrodes E11B) and the first alignment film AL11 arranged on the first substrate S11, the second alignment film AL12 arranged on the second substrate S12, and the first liquid crystal layer LC1.

FIG. 8A shows that an alignment treatment direction of the first alignment film AL11 differs from an alignment treatment direction of the second alignment film AL12. Specifically, the first alignment film AL11 is subjected to the alignment treatment in a direction ALD1 perpendicular to the X-axis direction and in parallel to the Y-axis direction, as shown in FIG. 4A. In other words, the alignment direction ALD1 intersects so as not to be perpendicular to the extension directions of the first branch electrodes E11A and the second branch electrodes E11B. As shown in FIG. 4B, the second alignment film AL12 is subjected to the alignment treatment in a direction ALD2 perpendicular to the Y-axis direction and in parallel to the X-axis direction. In other words, the alignment direction ALD2 intersects so as not to be perpendicular to the extension directions of the third branch electrodes E12A and the fourth branch electrodes E12B. Therefore, in the first liquid crystal cell 10 shown in FIG. 8A, the first alignment film AL11 is subjected to alignment treatment in a left-right direction of the drawing, and the second alignment film AL12 is subjected to alignment treatment in a normal direction of the drawing. The alignment treatment may be a rubbing treatment or a photo-alignment treatment.

As the first liquid crystal layer LC1, the TN liquid crystal is used. Since the alignment direction ALD1 of the first alignment film AL11 and the alignment direction ALD2 of the second alignment film AL12 are perpendicular to each other, liquid crystal molecules in the first liquid crystal layer LC1 are aligned so that a longitudinal direction of the liquid crystal molecules is twisted by 90 degrees from the first alignment film AL11 to the second alignment film AL12 without an effect of to an external electric field. FIG. 8A shows a state in which no voltage is applied to the first branch electrodes E11A and the second branch electrodes E11B, and shows a state in which a long axis of the liquid crystal molecules is twisted by 90 degrees and aligned.

Although FIG. 8A shows an example in which the liquid crystal layer LC1 is formed of a positive-type twisted nematic liquid crystal (TN liquid crystal) and long axes of the liquid crystal molecules are aligned in the same direction as the alignment direction of the alignment film (i.e., horizontal alignment), it is also possible to use a negative-type liquid crystal by rotating the alignment direction of the alignment film by 90 degrees. The liquid crystal preferably contains a chiral agent that imparts twist to liquid crystal molecules. In addition, the liquid crystal may be vertically aligned.

FIG. 8B shows a state in which a low-level voltage VL is applied to the first branch electrodes E11A and a high-level voltage VH is applied to the second branch electrodes E11B. In this condition, a lateral electric field is generated between the first branch electrodes E11A and the second branch electrodes E11B. As shown in FIG. 8B, an alignment direction of the liquid crystal molecules on the first substrate S11 side is changed by an effect of the lateral electric field. For example, the alignment of the liquid crystal molecules on the first substrate S11 side is changed such that a long-axis direction is oriented in a direction parallel to a direction of the electric field.

The low-level voltage VL and the high-level voltage VH applied to the first branch electrodes E11A and the second branch electrodes E11B are set as appropriate. For example, 0V is applied as a low-level voltage VL, and a voltage of 5 to 30V is applied as a high-level voltage VH. The low-level voltage VL and the high-level voltage VH are alternately applied to the first branch electrodes E11A and the second branch electrodes E11B. For example, in a certain period of time, the low-level voltage VL may be applied to the first branch electrodes E11A, and the high-level voltage VH may be applied to the second branch electrodes E11B, and in a subsequent certain period of time, the high-level voltage VH may be applied to the first branch electrodes E11A and a low-level voltage VL may be applied to the second branch electrode E11B. In this way, the voltage may be applied such that a level of the voltage synchronized and changes periodically between the two electrodes.

It is possible to generate an alternating electric field and suppress degradation of the first liquid crystal layer LC1, by alternately applying the low-level voltage VL and the high-level voltage VH to the first branch electrodes E11A and the second branch electrodes E11B. A frequency of the voltage applied to the first branch electrodes E11A and the second branch electrodes E11B may be a frequency at which the liquid crystal molecules can follow a change in the electric field, and may be, for example, 15 to 100 Hz.

FIG. 8C shows a state in which a low-level voltage VL is applied to the third branch electrodes E12A and a high-level voltage VH is applied to the fourth branch electrodes E12B. In this condition, a lateral electric field is generated between the third branch electrodes E12A and the fourth branch electrodes E12B. As shown in FIG. 8C, an alignment direction of the liquid crystal molecules on the second substrate S12 side is changed by an effect of the lateral electric field. For example, the alignment of the liquid crystal molecules on the second substrate S12 side is changed such that a long-axis direction is oriented in a direction parallel to a direction of the electric field.

The low-level voltage VL and the high-level voltage VH applied to the third branch electrodes E12A and the fourth branch electrodes E12B are set as appropriate. For example, 0 V is applied as a low-level voltage VL, and a voltage of 5 to 30 V is applied as a high-level voltage VH. Similarly, to the first branch electrodes E11A and the second branch electrodes E11B described above, the low-level voltage VL and the high-level voltage VH are alternately applied to the third branch electrodes E12A and the fourth branch electrodes E12B.

It is possible to generate an alternating electric field and suppress degradation of the first liquid crystal layer LC1 by alternately applying the low-level voltage VL and the high-level voltage VH to the third branch electrodes E12A and the fourth branch electrodes E12B. A frequency of the voltage applied to the third branch electrodes E12A and the fourth branch electrodes E12B may be a frequency at which the liquid crystal molecules can follow a change in the electric field, and may be, for example, 15 to 100 Hz.

It is known that a refractive index of a liquid crystal changes depending on an alignment state. As shown in FIG. 8A, in an off state in which no electric field is applied to the first liquid crystal layer LC1, a long-axis direction of the liquid crystal molecules is oriented horizontally with respect to the surface of the substrate and is oriented in a state of being twisted by 90° from the first substrate S11 side to the second substrate S12 side. The liquid crystal layer LC1 has a substantially uniform refractive index distribution in this orientation. Therefore, although a first polarization component PL1 and a second polarization component PL2 perpendicular to the first polarization component PL1 of the light incident on the first liquid crystal cell 10 are affected by an initial alignment of the liquid crystal molecules to rotate a polarization axis (hereinafter, a rotation function of the polarization axis in the liquid crystal layer is referred to as optical rotation), the first polarization component PL1 and the second polarization component PL2 are transmitted through the first liquid crystal layer LC1 almost without being refracted (or scattered). Here, the first polarization component PL1 corresponds to, for example, P-polarized light among natural light, and the second polarization component corresponds to, for example, S-polarized light.

On the other hand, as shown in FIG. 8B, in an on state where a voltage is applied to the first branch electrodes E11A and the second branch electrodes E11B and an electric field is formed, in the case where the first liquid crystal layer LC1 has a positive dielectric anisotropy, the liquid crystal molecules are aligned such that the long axis thereof is a long the electric field. Consequently, as shown in FIG. 8B, in the first liquid crystal layer LC1, a region, in which the liquid crystal molecules rise substantially perpendicularly, above the first branch electrodes E11A and the second branch electrodes E11B, a region, in which the liquid crystal molecules are oriented obliquely along a distribution of the electric field, between the first branch electrodes E11A and the second branch electrodes E11B and a region, in which the liquid crystal molecules are maintained in the initial alignment state, away from the first branch electrodes E11A and the second branch electrodes E11B, and the like are formed.

As shown in FIG. 8B, between the electrodes of the first branch electrodes E11A and the second branch electrodes E11B, the long axe of the liquid crystal molecules is aligned in a convex arc shape along the direction in which the electric fie Id is formed.

Here, as schematically shown in FIG. 8B, an inclination in the Z-direction of the liquid crystal molecules located substantially at the center between the two electrodes hardly changes. On the other hand, the liquid crystal molecules located on a side of each of the electrodes from a central portion are oriented (tilted) with respect to the Z-direction in accordance with an intensity distribution of the electric field. Therefore, if the liquid crystal on the first substrate S11 is viewed as a whole, the liquid crystal molecules are aligned in an arc shape between the first branch electrodes E11A and the second branch electrodes E11B.

As a result, the liquid crystal layers LC1 have arcuate dielectric constants, and the polarized light components perpendicular to the extension direction of the first branch electrodes E11A and the second branch electrodes E11B of the incident light are diffused. Further, as shown in FIG. 8C, on the second substrate S12 side, third branch electrodes E12A and the fourth branch electrodes E12B arranged so as to intersect the electrodes of the first substrate S11 cause similar phenomena, and the polarization components optically rotated in the liquid crystal layer are diffused.

As described with reference to FIG. 8B and FIG. 8C, in the liquid crystal layer LC1, the first substrate S11 side and the second substrate S12 side can independently control the diffusions of different polarization components. Incidentally, in order to suppress mutual interference between an electric field formed on the first substrate S11 side and an electric field formed on the second substrate S12 side as much as possible, it is preferable that a distance between the first substrate S11 and the second substrate S12 opposed to each other has a length of 1 times or more of a center distance between the first branch electrode E11A and the second branch electrode E11B, or a center distance between the third branch electrode E12A and the fourth branch electrode E12B. Here, the center distance between the first branch electrode E11A and the second branch electrode E11B is a distance from a center of a width of the first branch electrode E11A to a center of a width of the second branch electrode E11B. The same applies to the center distance between the third branch electrode E12A and the fourth branch electrode E12B.

The liquid crystal molecules have a refractive index anisotropy $\Delta n$. Therefore, the first liquid crystal layers LC1 in the on state have a refractive index distribution or a retardation distribution corresponding to an alignment state of the liquid crystal molecules. The retardation here is represented by $\Delta n \cdot d$ where d is a thickness of the first liquid crystal layer LC1. In the on state, the first polarization components PL1 are scattered under an effect of the refractive index distribution in the first liquid crystal layer LC1 when the first polarization components PL1 are transmitted through the first liquid crystal layer LC1.

Although the electro-optical function of the first liquid crystal cell 10 has been described above, the second liquid crystal cell has the same configuration.

As described above, by stacking the first liquid crystal cell 10 and the second liquid crystal cell 20, predetermined polarization components of the incident light passing through the first liquid crystal layer LC1 and the second liquid crystal layer LC2 are diffused by both liquid crystal layers LC1 and LC2.

Further, by overlapping the first liquid crystal cell 10 and the second liquid crystal cell 20, scattering of a specific polarization component can be individually controlled, and light distribution of light emitted from a light source can be controlled.

In the optical device 100 of the present embodiment described above, in the first liquid crystal cell 10 and the second liquid crystal cell 20, the extension direction of the first electrode E11 and the first electrode E21 is inclined by a predetermined angle with respect to the X-axis direction, that is, the first sides s1 of the first substrate S11 and the first substrate S21, and the extension direction of the second electrode E12 and the second electrode E21 is inclined by a predetermined angle with respect to the Y-axis direction, that is, the second sides s2 of the second substrate S12 and the second substrate S21. Further, when the first liquid crystal cell 10 and the second liquid crystal cell 20 are overlapped, the outer surface (ES22 in FIG. 6) of the second substrate S22 of the second liquid crystal cell 20 and the outer surface (ES12 in FIG. 6) of the second substrate S12 of the first liquid crystal cell 10 are arranged to face each other. In this way, the first electrode E11 and the second electrode E12 of the first liquid crystal cell 10 and the first electrode E21 and the second electrode E22 of the second liquid crystal cell 20 are overlapped with at least partially shifted from each other, so that it is possible to prevent ripple and uneven brightness while controlling the light distribution of the light emitted from the light source.

Further, as described above, the extension directions of the first electrode E11 and the second electrode E12 are inclined by a predetermined angle with respect to the sides of the first substrate S11 and the second substrate S12 of the first liquid crystal cell 10. Similarly, the extension directions of the first electrode E21 and the second electrode E22 are inclined by a predetermined angle with respect to the sides of the first substrate S21 and the second substrate S22 of the second liquid crystal cell 20. Thus, when the first liquid crystal cell 10 and the second liquid crystal cell 20 are bonded to each other, even if the first liquid crystal cell 10 and the second liquid crystal cell 20 are arranged so as to overlap each other along the side of the corresponding substrate, the first electrode E11 and the second electrode E12 of the first liquid crystal cell 10 and the first electrode E21 and the second electrode E22 of the second liquid crystal cell 20 do not overlap each other in a completely matched state. In other words, the first electrode E11 and the second electrode E12 of the first liquid crystal cell 10 and the first electrode E21 and the second electrode E22 of the second liquid crystal cell overlap with at least partially shifted from each other. Since it is not necessary to adjust the inclination of the cells the m se Ives when the first liquid crystal cell 10 and the second liquid crystal cell 20 are bonded to each other, it is easy to manufacture the optical device 100.

In the present embodiment, the first electrodes E11 (the first branch electrodes E11A and the second branch electrodes E11B) and E21 (the first branch electrodes E21A and the second branch electrodes E21B), and the second electrodes E12 (the third branch electrodes E12A and the fourth branch electrodes E12B) and E22 (the third branch electrodes E22A and the fourth branch electrodes E22B) of the first liquid crystal cell 10 and the second liquid crystal cell 20 have a linear pattern inclined by a predetermined angle with respect to the first side s1 or the second side s2 of the first substrates S11 and S21 and the second substrates S12 and S22. However, shapes of the electrode patterns of the first liquid crystal cell 10 and the second liquid crystal cell 20 are not limited to linear shapes.

Second Embodiment

In a second embodiment, an example will be described in which shapes of electrodes of a first liquid crystal cell and a second liquid crystal constituting an optical device are different from the shapes of the electrodes of the first liquid crystal cell 10 and the second liquid crystal 10 constituting the optical device 100 according to the first embodiment. In addition, in the present embodiment, the same or similar configurations as those of the optical device 100 of the first embodiment described above are denoted by the same reference signs (or numbers are appended with a, b, and the like), and detailed description thereof will be omitted.

In the present embodiment, other configurations except for the shapes of the electrodes of the first liquid crystal cell and the second liquid crystal cell constituting the optical device are substantially the same as those of the optical device 100 of the first embodiment described above. Therefore, in the following description, the shapes of the electrodes of the first liquid crystal cell and the second liquid crystal cell constituting the optical device will be mainly described, and the description of other configurations will be omitted.

Figure 9A:
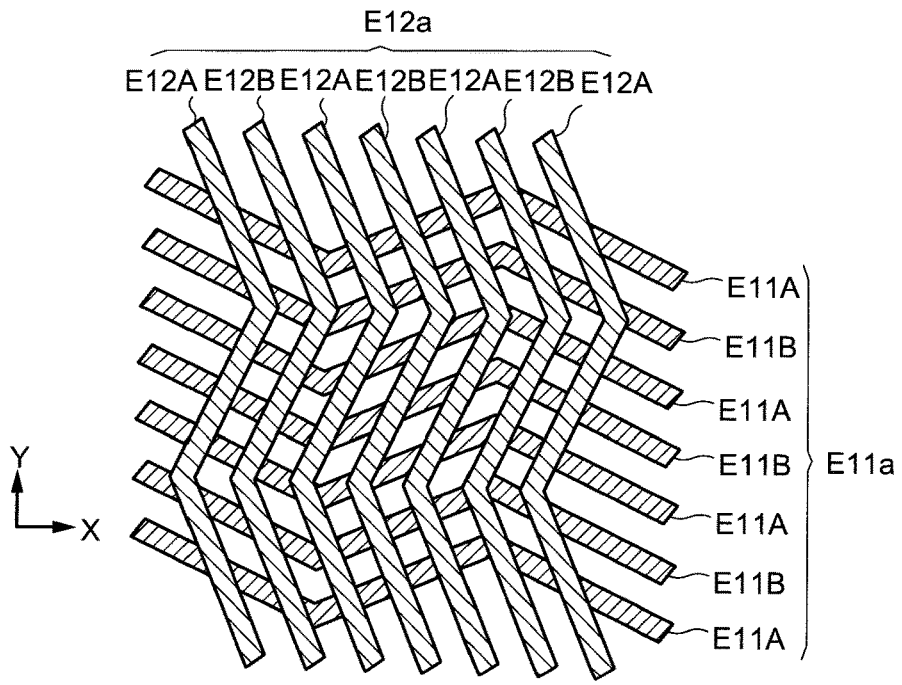
FIG. 9A is a schematic plan view showing an example of patterns of electrodes arranged in a first liquid crystal cell constituting a liquid crystal optical element according to an embodiment of the present disclosure.
Figure 9B:
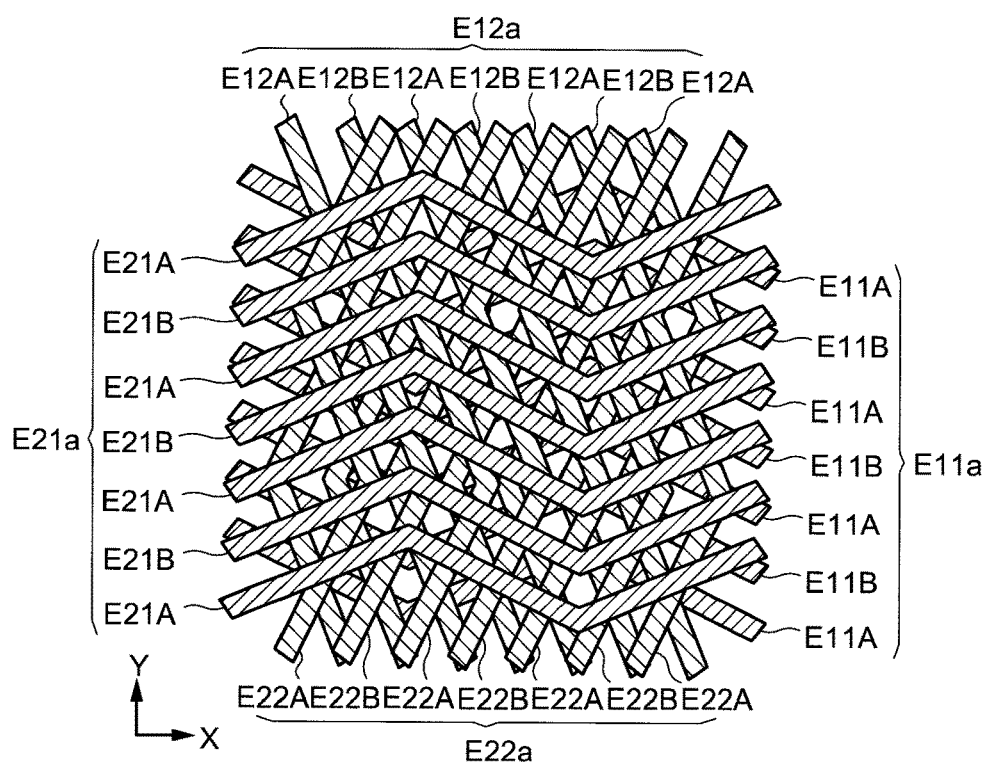
FIG. 9B is a schematic plan view showing an example of patterns of electrodes respectively arranged on a first liquid crystal cell and a second liquid crystal cell constituting a liquid crystal optical element according to an embodiment of the present disclosure.
Figure 10A:
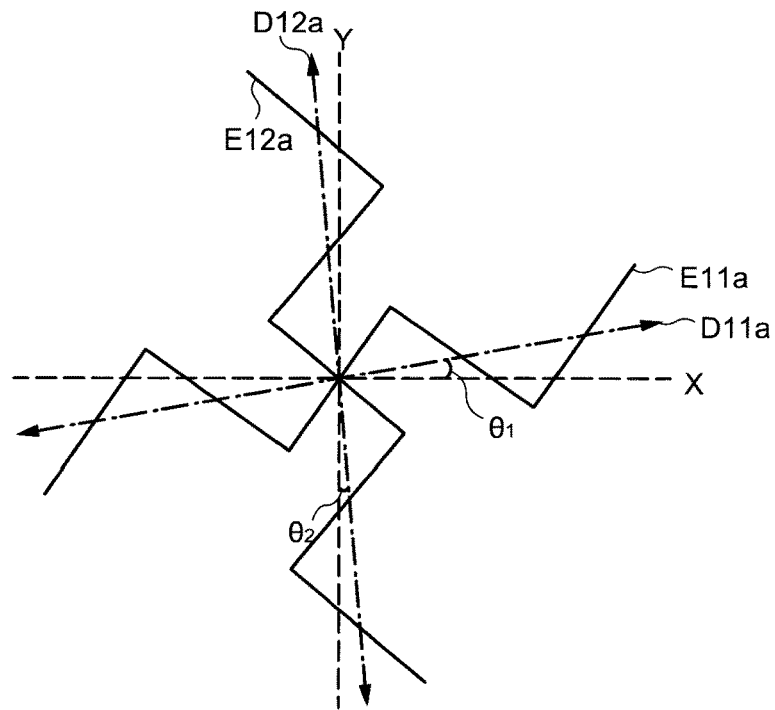
FIG. 10A is a schematic view for explaining an inclination of extension directions of the patterns of the respective electrodes shown in FIG. 9A.
Figure 10B:
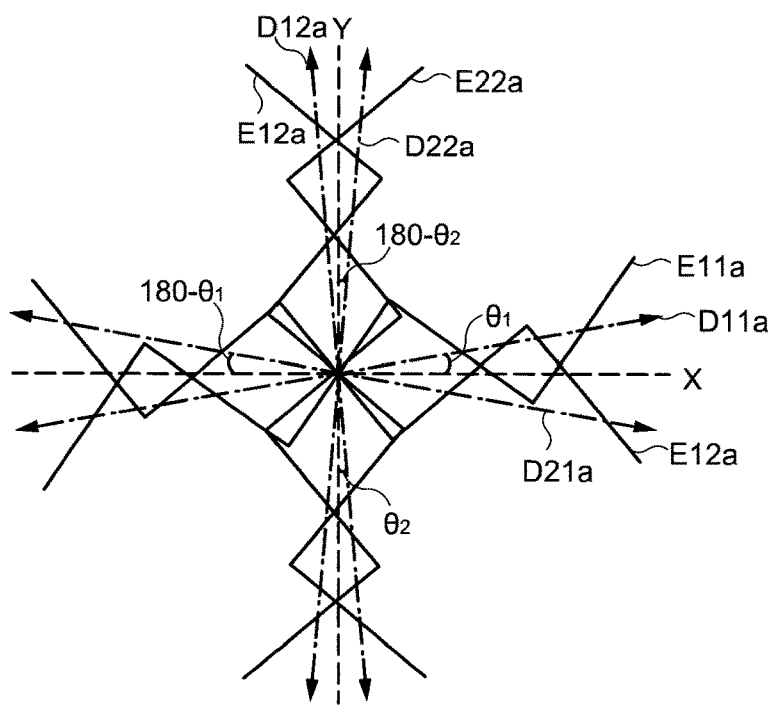
FIG. 10B is a schematic view for explaining an inclination of extension directions of the patterns of the respective electrodes shown in FIG. 9B.

FIG. 9A is a schematic plan view showing a first electrode E11a and a second electrode E12a in a first liquid crystal cell 10a constituting an optical device 100a according to the present embodiment in the case where the first substrate S11 and the second substrate S12 are arranged so as to overlap each other. FIG. 9B is a schematic plan view showing first electrodes E11a and E21a and second electrodes E12a and E22a in the case where the first liquid crystal cell 10a and a second liquid crystal cell 20a constituting the optical device 100a are arranged so as to overlap each other, that is, in the case where the first substrate S11 and the second substrate S12 of the first liquid crystal cell 10a and the first substrate S21 and the second substrate S12 of the second liquid crystal cell 20a are arranged so as to overlap each other. FIG. 10A is a schematic view for explaining an inclination of extension directions of the first electrode E11a and the second electrode E12a shown in FIG. 9A. FIG. 10B is a schematic view for explaining an inclination of extension directions of the first electrode E11a, the second electrode E12a, the first electrode E21a, and the second electrode E22a shown in FIG. 9B.

As shown in FIG. 9A, in the first liquid crystal cell 10a, the first electrode E11a of the first substrate S11 includes the plurality of first branch electrodes E11A and the plurality of second branch electrodes E11B each having a first pattern having a zig-zag shape in a direction inclined by a predetermined angle with respect to the X-axis direction (first direction). The first pattern of zig-zag shape has a plurality of bending points. Similarly, the second electrode E12a includes a plurality of third branch electrodes E12A and a plurality of fourth branch electrodes E12B having a second pattern having a zig-zag shape in a direction inclined by a predetermined angle with respect to the Y-axis direction (second direction). The second pattern of zig-zag shape has a plurality of bending points. Here, as shown in FIG. 10A, an extension direction D11a of the first electrode E11a is inclined by the predetermined angle $\theta_1$ with respect to the X-axis direction. The angle $\theta_1$ is 0.5±1° or more and 10±1° or less. On the other hand, an extension direction D12a of the second electrode E12a is inclined by the predetermined angle $\theta_2$ with respect to the Y-axis direction. The angle $\theta_2$ is 0.5±1° or more and 10±1° or less. That is, the extension direction D11a of the first electrode E11a and the extension direction D12a of the second electrode E12a intersect each other so as not to be perpendicular to each other.

In the second liquid crystal cell 20a, the first electrode E21a of the first substrate S21 includes a plurality of first branch electrodes E21A and a plurality of second branch electrodes E21B each having the first pattern having the zig-zag shape and extending in the direction inclined by the predetermined angle with respect to the X-axis direction (first direction), similar to the first electrode 11a. The second electrode E22a, like the second electrode 12a, includes a plurality of third branch electrodes E22A and a plurality of fourth branch electrodes E22B having the second pattern having a zig-zag shape and extending in the direction inclined by the predetermined angle with respect to the Y-axis direction (second direction). As in the first embodiment, in the second liquid crystal cell 20a, the shape of the first electrode E21a of the first substrate S21 is the same as the shape of the first electrode 11a of the first liquid crystal cell 10a, and the shape of the second electrode E22a of the second substrate S22 is the same as the shape of the second electrode 12a of the first liquid crystal cell 10a.

When the first liquid crystal cell 10a and the second liquid crystal cell 20a are stacked and bonded together, the second liquid crystal cell 20a is arranged so that a surface opposite to a surface on which the second electrode E22a of the second substrate S22 is arranged faces a surface on a side opposite to a surface on which the second electrode E12a of the second substrate S12 of the first liquid crystal cell 10a is arranged via the first transparent adhesive layer (TA1). Then, as shown in FIG. 9B, the first branch electrodes E21A and the second branch electrodes E21B of the first electrode E21a overlap each other at least partially shifted from the first branch electrodes E11A and the second branch electrodes E11B of the first electrode E11a in the first liquid crystal cell 10a in a plan view. In other words, the first electrode E21a of the second liquid crystal cell 20a and the first electrode E11a of the first liquid crystal cell 10a do not overlap each other in a completely matched state in a plan view. Similarly, the third branch electrodes E22A and the fourth branch electrodes E22B of the second electrode E22a overlap each other at least partially shifted from the second branch electrodes E12A and the fourth branch electrodes E12B of the second electrode E12a in the first liquid crystal cell 10a in a plan view. In other words, the second electrode E22a of the second liquid crystal cell 20a and the second electrode E12a of the first liquid crystal cell 10a do not overlap each other in a completely matched state in a plan view. As shown in FIG. 10B, the extension direction D11a of the first electrode E21a of the second liquid crystal cell 20a is inclined by the angle 180-$\theta_1$ with respect to the X-axis direction. The angle $\theta_1$ is 0.5±1° or more and 10±1° or less. On the other hand, an extension direction D22a of the second electrode E22a is inclined by the angle 180-$\theta_2$ with respect to the Y-axis direction. The angle $\theta_2$ is 0.5±1° or more and 10±1° or less. That is, the extension direction D21a of the second electrode E21a and the extension direction D22a of the second electrode E22a intersect each other so as not to be perpendicular to each other.

As described above, in the present embodiment, the shapes of the first electrodes E11a and E21a and the second electrodes E12a and E22a of the first liquid crystal cell 10a and the second liquid crystal 20a constituting the optical device 100a have a zig-zag shape. Further, the extension directions of the first electrodes E11a and E21a are inclined by a predetermined angle with respect to the X-axis direction (first direction), and the extension directions of the second electrodes E12a and E22a are inclined by a predetermined angle with respect to the Y-axis direction (second direction). In the first liquid crystal cell 10a, the first electrode E11a and the second electrode E12a intersect each other so as not to be perpendicular to each other. In the second liquid crystal cell 20a, the first electrode E21a and the second electrode E22a intersect each other so as not to be perpendicular to each other. Since the first liquid crystal cell 10a and the second liquid crystal cell 20a are stacked and bonded so that the second substrate S12 of the first liquid crystal cell 10a and the second substrate S22 of the second liquid crystal cell 20a face each other, the first electrodes E11a and E21a and the second electrodes E12a and E22a are arranged so as not to overlap each other in a completely matched state in a plan view. That is, the first electrodes E11a and E21a and the second electrodes E12a and E22a are arranged so as to overlap each other at least partially shifted from each other. Therefore, similarly to the optical device 100 of the first embodiment, the optical device 100a according to the present embodiment can prevent optical interference and reduce ripple and brightness unevenness. Further, when the first liquid crystal cell 10a and the second liquid crystal cell 20a are bonded to each other, the inclination of the cells themselves need not be adjusted and arranged.

In the present embodiment, in the first liquid crystal cell 10a and the second liquid crystal cell 20a, the case where the first electrodes E11a and E21a arranged on the first substrates S11 and S21 and the second electrodes E12a and E22a arranged on the second substrates S12 and S22 each have a zig-zag pattern is explained. Here, in the case where the patterns of the electrodes arranged in the first liquid crystal cell 10a and the second liquid crystal cell 20a have a zig-zag shape, it is preferable that the bending points of the electrode patterns do not overlap each other when the first liquid crystal cell 10a and the second liquid crystal cell 20a are overlapped with each other. Further, in the case where each of the electrode patterns has a zig-zag shape, if each of the electrode patterns has a symmetrical shape, interference may occur when the first liquid crystal cell 10a and the second liquid crystal cell 20a overlap each other. Therefore, in each of the electrode patterns, a distance between a predetermined bending point and an adjacent bending point may be different from a distance between the predetermined bending point and another adjacent bending point. Alternatively, the positions of the plurality of bending points may be randomly set in each of the electrode patterns.

In the present embodiment, in the first liquid crystal cell 10a and the second liquid crystal cell 20a, the first electrodes E11a and E21a arranged on the first substrates S11 and S21 and the second electrodes E12a and E22a arranged on the second substrates S12 and S22 each have a zig-zag pattern having a plurality of bending points. However, the shape of each electrode pattern is not limited thereto. For example, in the first liquid crystal cell 10a and the second liquid crystal cell 20a, the patterns of the first electrodes E11a and E21a and the second electrodes E12a and E22a may have a shape having one bending point, that is, a shape of a so-called "dogleg" shape. In this case, if the shape of the pattern of the electrodes has a symmetrical shape, interference may occur when the first liquid crystal cell 10a and the second liquid crystal cell 20a overlap each other. Therefore, in the pattern of each of the electrodes, a distance between the bending point and one end of the pattern and a distance between the predetermined bending point and the other end of the pattern may be different from each other.

Figure 11:
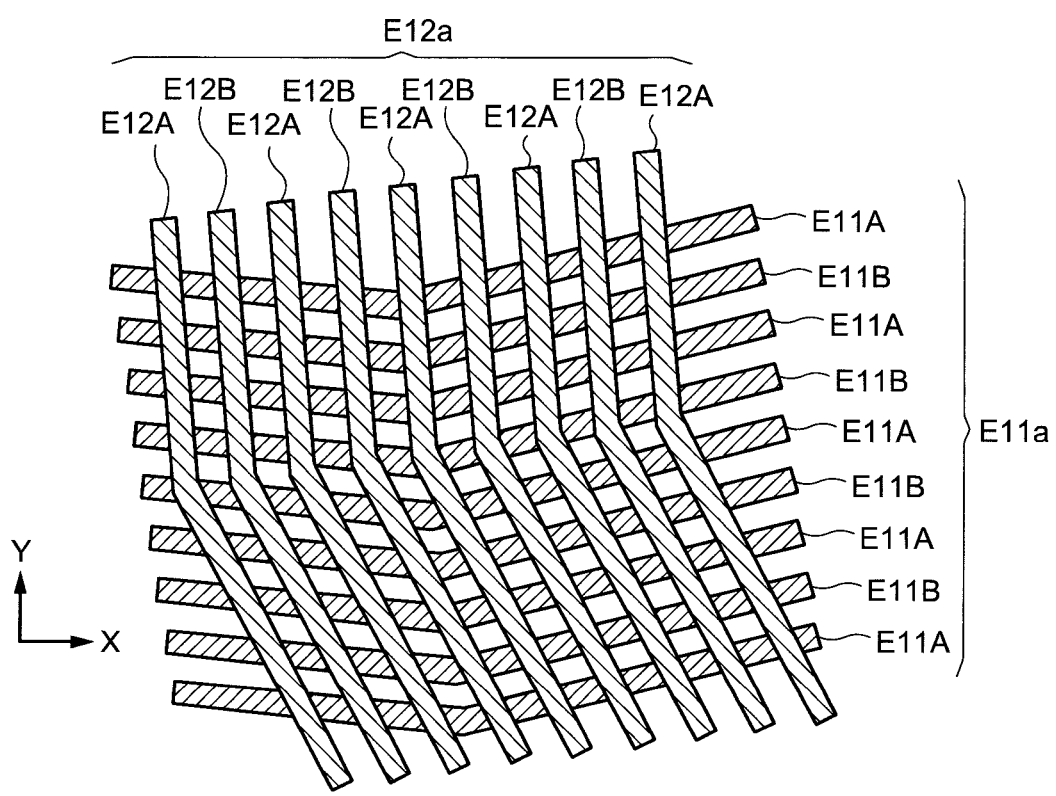
FIG. 11 is a schematic plan view showing an example of patterns of electrodes arranged in a first liquid crystal cell constituting a liquid crystal optical element according to an embodiment of the present disclosure.
Figure 12:
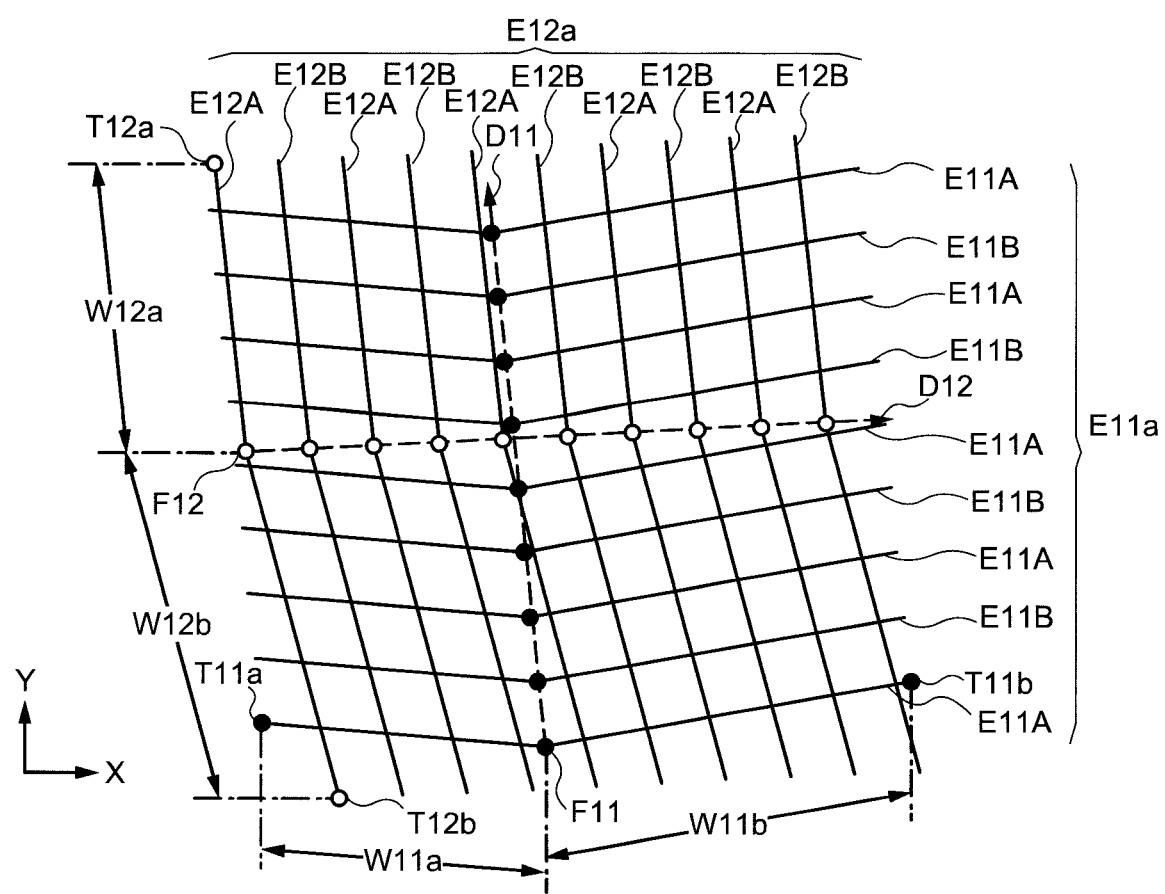
FIG. 12 is a schematic view for explaining positions of bending points of the electrodes shown in FIG. 11.

FIG. 11 is a schematic plan view showing the first electrode E11a and the second electrode E12a in the case where the first substrate S11 and the second substrate S12 arranged with the first electrode E11a and the second electrode E12a each having a pattern each having a dogleg shape are arranged so as to overlap each other. In addition, here, as in the embodiment described above, the first substrate S11 and the second substrate S12 are overlapped so that the first electrode E11a and the second electrode E12a face each other. FIG. 12 is a schematic view for explaining positions of the bending points of the first electrode E11a and the second electrode E12a shown in FIG. 11. In FIG. 12, the first electrode E11a and the second electrode E12a are shown in a simplified manner so that the position of the bending point can be easily visually recognized. FIG. 12 is a schematic view of the first liquid crystal cell 10a in a plan view from the second substrate S12 as in FIG. 11.

As shown in FIG. 11 and FIG. 12, the first electrode E11a includes the first branch electrodes E11A and the second branch electrodes E11B. Each of the first branch electrodes E11A and the second branch electrodes E11B has a shape including one bending point F11, a pattern of a so-called "dogleg" shape (first pattern). The first branch electrode E11A and the second branch electrode E11B are patterned asymmetrically about the bending point F11. Specifically, in the patterns of the first branch electrode E11A and the second branch electrode E11B, assuming that a distance between the bending point F11 and one end portion T11a of the pattern of the first electrode E11a (the first branch electrode E11A and the second branch electrode E11B) is W11a, and a distance between the bending point F11 and the other end portion T11b of the pattern of the first electrode E11a (the first branch electrode E11A and the second branch electrode E11B) is W11b, then W11a W11b. In addition, positions of the bending points F11 of the first branch electrodes E11A and the second branch electrodes E11B are shifted from the bending point F11 of the first branch electrodes E11 or the second branch electrodes E11B which is adjoining in the Y-axis direction. For example, as shown in FIG. 12, the extension direction D11 of a line connecting the bending points F11 of the first branch electrode E11A and the second branch electrode E11B may be inclined at a predetermined angle with respect to the Y-axis direction.

Similarly, the second electrode E12a includes the third branch electrodes E12A and the fourth branch electrodes E12B. Each of the third branch electrodes E12A and the fourth branch electrodes E12B has a shape having one bending point F12, a pattern (second pattern) of a so-called "dogleg" shape. The third branch electrode E12A and the fourth branch electrode E12B are patterned asymmetrically about the bending point F12. Specifically, in the pattern of the third branch electrode E12A and the fourth branch electrode E12B, assuming that a distance between the bending point F12 and one end portion T12a of the pattern of the second electrode E12a (the third branch electrode E12A and the second branch electrode E12B) is W12a, and a distance between the bending point F12 and the other end portion T12b of the pattern of the second electrode E12b (the third branch electrode E12A and the second branch electrode E12B) is W12b, then W12a≠W12b. Further, positions of the bending point F12 of the third branch electrode E12A and the fourth branch electrode E12B are shifted from the bending point F12 of the third branch electrode E12A or the fourth branch electrode E12B which is adjoining in the X-axis. For example, as shown in FIG. 12, an extension direction D12 of the line connecting the bending points F12 of the third branch electrode E12A and the fourth branch electrode E12B may be inclined at a predetermined angle with respect to the X-axis direction.

In the case where the pattern of the electrodes has a dogleg shape, depending on an angle of the pattern, when bonding the first liquid crystal cell 10a and the second liquid crystal cell 20a are bonded each other, moire may occur due to interference caused by electrodes overlapping each other. In order to prevent an occurrence of moire by preventing interference, it is preferable to devise a setting of the angle of the pattern of each electrode.

Figure 13A:
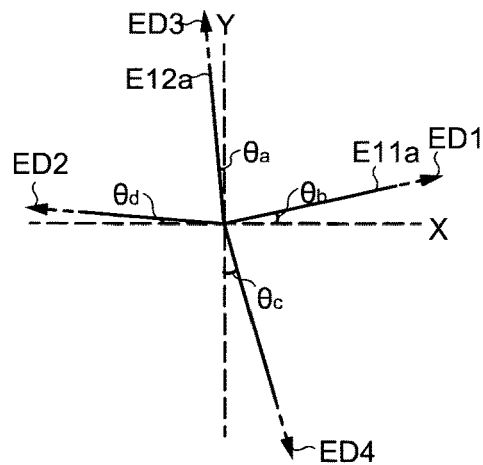
FIG. 13A is a schematic view for explaining a setting of an angle of a pattern of each electrode.
Figure 13B:
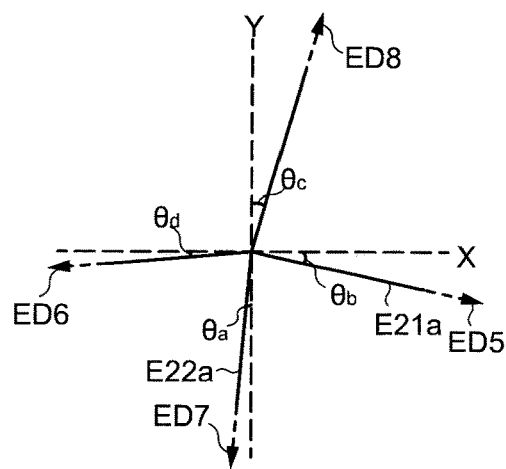
FIG. 13B is a schematic view for explaining a setting of an angle of a pattern of each electrode.
Figure 13C:
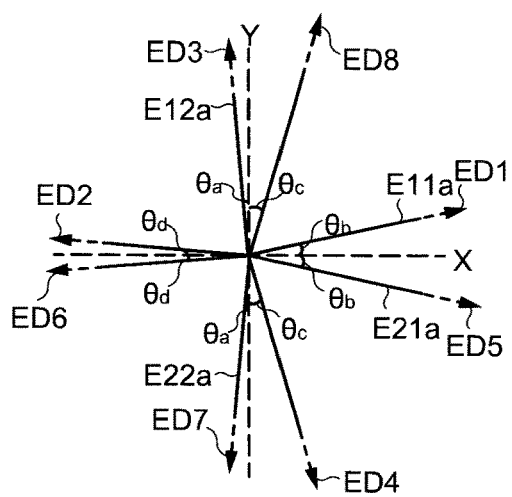
FIG. 13C is a schematic view for explaining a setting of an angle of a pattern of each electrode.

FIG. 13A to FIG. 13C are schematic views for explaining the setting of the angle of the pattern of each electrode in the case where each electrode has the pattern of the dogleg shape. In FIG. 13A to FIG. 13C, the patterns of the electrodes are simplified in order to make it easier to visualize the angles of the patterns of the electrodes. In FIG. 13A to FIG. 13C, in order to make the angle of the pattern of each electrode easy to understand, the pattern of each electrode is arranged on an XY coordinate plane, and the bending point of each electrode is arranged at an origin on the XY coordinate plane. FIG. 13A is a schematic view of the case where the first liquid crystal cell 10a is viewed from the second substrate S12 side, FIG. 13B is a schematic view of the case where the second liquid crystal cell 20a is viewed from the first substrate S21 side, and FIG. 13C is a schematic view when viewed from the first liquid crystal cell S21 side of the second liquid crystal cell 20a, that is, when viewed from the light emitting side of the liquid crystal optical element 102 in the case where the outer surface of the second substrate S12 of the first liquid crystal cell 10a is overlapped with the outer surface of the second substrate S22 of the second liquid crystal cell 20a facing each other (the same applies to FIG. 14A to FIG. 14C described later).

FIG. 13A shows an example of patterns of the first electrode E11a and the second electrode E12a in the first liquid crystal cell 10a. Referring to FIG. 13A, the first electrode E11a is extended in a first extension direction ED1 inclined by an angle $\theta_b$ with respect to the X-axis and in a second extension direction ED2 inclined by an angle $\theta_d$ with respect to the X-axis around the bending point. The first extension direction ED1 is located in a first quadrant on the XY coordinate plane, and the second extension direction ED2 is located in a second quadrant on the XY coordinate plane. On the other hand, the second electrode E12a is extended in a third extension direction ED3 inclined by an angle $\theta_a$ with respect to the Y-axis and in a fourth extension direction ED4 inclined by an angle $\theta_c$ with respect to the Y-axis around the bending point. The third extension direction ED3 is located in the second quadrant on the XY coordinate plane, and the fourth extension direction ED4 is located in the fourth quadrant. Here, it is assumed that it is $\theta_a=\theta_c$ or $\theta_a\neq\theta_c$ and $\theta_b=\theta_c$ or $\theta_b\neq\theta_c$. In addition, it is assumed that it is $\theta_b=\theta_d$ or $\theta_b\neq\theta_d$.

FIG. 13B shows an example of patterns of a first electrode E21a and a second electrode E22a in a second liquid crystal cell 20a. The first liquid crystal cell 10a and the second liquid crystal cell 20a have the same configuration, that is, a pattern of the first electrode E21a in the second liquid crystal cell 20a is the same as the pattern of the first electrode E11a in the first liquid crystal cell 10a, and a pattern of the second electrode E22a in the second liquid crystal cell 20a is the same as the pattern of the second electrode E12a in the first liquid crystal cell 10a. As described above, when the first liquid crystal cell 10a and the second liquid crystal cell 20a are overlapped with each other and bonded, a surface of the second substrate S12 of the first liquid crystal cell 10a on which the second electrode E12a is not arranged and a surface of the second substrate S22 of the second liquid crystal cell 20a on which the second electrode E22a is not arranged are overlapped so as to face each other via the first transparent adhesive layer TA1. FIG. 13B shows electrode patterns of the first electrode E21a and the second electrode E22 in the state where the second substrate S22 of the second liquid crystal cell 20a faces the second substrate S12 of the first liquid crystal cell 10a. Here, as an example, the second liquid crystal cell 20a is inverted about the X-axis, and the second substrate S22 of the second liquid crystal cell 20a and the second substrate S12 of the first liquid crystal cell 10a are arranged so as to face each other via the first transparent adhesive layer TA1.

Referring to FIG. 13B, the first electrode E21a is extended in a fifth extension direction ED5 inclined by the angle $\theta_b$ with respect to the X-axis and in a sixth extension direction ED6 inclined by the angle $\theta_d$ with respect to the X-axis around the bending point. The fifth extension direction ED5 is located in the fourth quadrant on the XY coordinate plane, and the sixth extension direction ED6 is located in the third quadrant on the XY coordinate plane. On the other hand, the second electrode E22a is extended in a seventh extension direction ED7 inclined by the angle $\theta_a$ with respect to the Y-axis and in an eighth extension direction ED8 inclined by the angle $\theta_c$ with respect to the Y-axis around the bending point. The seventh extension direction ED7 is located in the third quadrant on the XY coordinate plane, and the eighth extension direction ED8 is located in the first quadrant.

FIG. 13C shows patterns of the first electrodes E11a and E21a and the second electrodes E12a and E22a when the first liquid crystal cell 10a shown in FIG. 13A and the second liquid crystal cell 20a shown in FIG. 13B are stacked and bonded together. Referring to FIG. 13C, the first electrode E11a and the second electrode E12a of the first liquid crystal cell 10a shown in FIG. 13A and the first electrode E21a and the second electrode E22a of the second liquid crystal cell 20a shown in FIG. 13B are not overlapped with each other in a completely matched state. That is, they are overlapped in a state in which at least some of them are shifted from each other. As described with reference to FIG. 13B, here, the second liquid crystal cell 20a is inverted about the X-axis and is arranged such that the second substrate S22 of the second liquid crystal cell 20a and the second substrate S12 of the first liquid crystal cell 10a face each other via the first transparent adhesive layer TA1. As shown in FIG. 13C, in the case where the second liquid crystal cell 20a is inverted about the X-axis, the corresponding patterns of the electrodes in the first liquid crystal cell 10a and the second liquid crystal cell 20a are extended in different directions. Specifically, the extension directions of the first electrode E11a of the first liquid crystal cell 10a are the extension direction ED1 extending in the first quadrant and the extension direction ED2 extending in the second quadrant, while extension directions of the first electrode E21a of the second liquid crystal cell 20a are the extension direction ED5 extending in the fourth quadrant and ED6 extension in the third quadrant. Similarly, the extension directions of the second electrode E12a of the first liquid crystal cell 10a are the extension direction ED3 extending in the second quadrant and the extension direction ED4 extending in the fourth quadrant, while extension directions of the second electrode E22a of the second liquid crystal cell 20a are the extension direction ED7 extending in the third quadrant and the extension direction ED8 extending in the first quadrant. As described above, in the case where the second liquid crystal cell 10a having the same configuration as that of the first liquid crystal cell 20a is inverted about the X-axis and overlapped with the first liquid crystal cell 10a, if the extension directions of the electrode patterns of the second electrode E12a of the first liquid crystal cell 10a and the second electrode E22a of the second liquid crystal cell 20a are different from each other, it is possible to prevent the electrodes from being overlapped with each other while being completely overlapped with each other. As a result, it is possible to prevent the occurrence of moire by preventing interference.

On the other hand, in the case where the second liquid crystal cell 20a is inverted about the X-axis, in the case where the extension directions of the patterns of the second electrode E12a of the first liquid crystal cell 10a and the second electrode E22a of the second liquid crystal cell 20a (here, the third extension direction ED3 and the fourth extension direction ED4 which are the extension direction of the second electrode E12a and the seventh extension direction ED7 and the eighth extension direction ED8 which are the extension direction of the second electrode E22a) are the same, there is a case where the second electrodes E12a and E22a in the first liquid crystal cell 10a and the second liquid crystal cell 20a completely coincide with each other. In such a case, there is a possibility that interference occurs due to the overlapping of the electrodes and moire occurs.

Figure 14A:
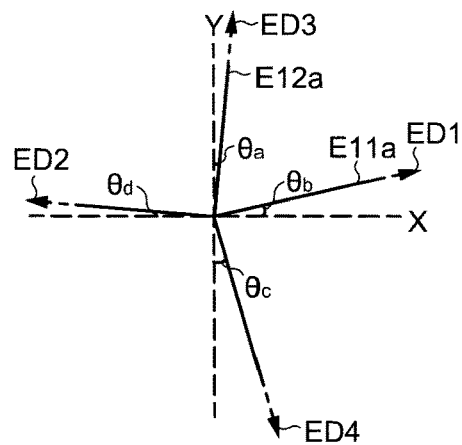
FIG. 14A is a schematic view for explaining a setting of an angle of a pattern of each electrode.
Figure 14B:
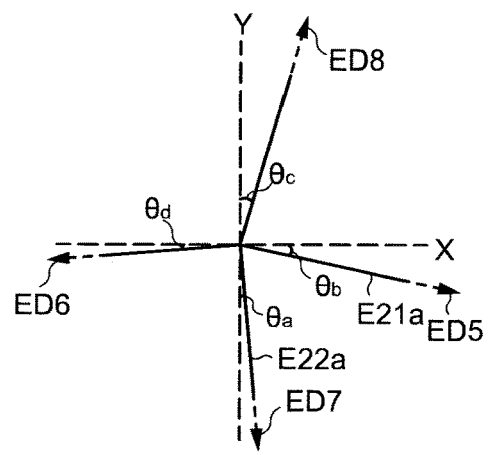
FIG. 14B is a schematic view for explaining a setting of an angle of a pattern of each electrode.
Figure 14C:
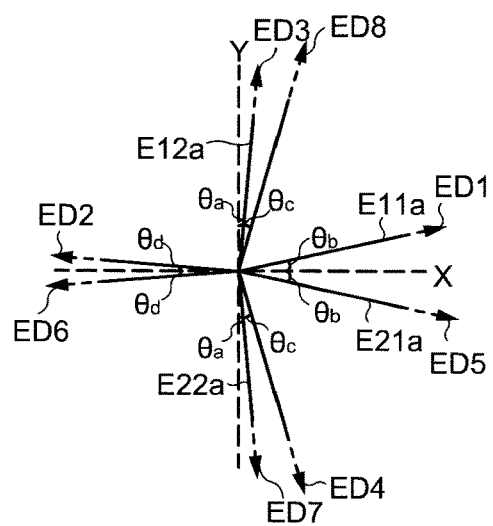
FIG. 14C is a schematic view for explaining a setting of an angle of a pattern of each electrode.

FIG. 14A to FIG. 14C are another schematic view for explaining a setting of the angle of the pattern of each electrode in the case where the pattern of each electrode has the dogleg shape. In FIG. 14A to FIG. 14C, same as in FIG. 13A to FIG. 13C, the pattern of each electrode is shown in a simplified manner in order to facilitate viewing of the angle of the pattern of each electrode. Further, the respective patterns are arranged on the XY coordinate plane, and the bending points of the respective electrodes are arranged at the origins on the XY coordinate plane.

FIG. 14A shows an example of the patterns of the first electrode E11a and the second electrode E12a in the first liquid crystal cell 10a. Referring to FIG. 14A, the first electrode E11a is extended in the first extension direction ED1 inclined by the angle $\theta_b$ with respect to the X-axis and in the second extension direction ED2 inclined by the angle $\theta_d$ with respect to the X-axis around the bending point. The first extension direction ED1 is located in the first quadrant on the XY coordinate plane, and the second extension direction ED2 is located in the second quadrant on the XY coordinate plane. On the other hand, the second electrode E12a is extended in the third extension direction ED3 inclined by the angle $\theta_a$ with respect to the Y-axis and in the fourth extension direction ED4 inclined by the angle $\theta_c$ with respect to the Y-axis around the bending point. The third extension direction ED3 is located in the first quadrant on the XY coordinate plane, and the fourth extension direction ED4 is located in the fourth quadrant. Here, it is assumed that it is $\theta_a \neq \theta_c$ and is $\theta_b = \theta_c$ or $\theta_b \neq \theta_c$. In addition, it is assumed that it is $\theta_b = \theta_d$ or $\theta_b \neq \theta_d$.

FIG. 14B shows an example of the patterns of the first electrode E21a and the second electrode E22a in the second liquid crystal cell 20a. In addition, in FIG. 14B, same as in FIG. 13B, the second liquid crystal cell 20a is inverted about the X-axis and is arranged such that the second substrate S22 of the second liquid crystal cell 20a and the second substrate S12 of the first liquid crystal cell 10a face each other via the first transparent adhesive layer TA1. Referring to FIG. 14B, the first electrode E21a is extended in the fifth extension direction ED5 inclined by the angle $\theta_b$ with respect to the X-axis and in the sixth extension direction ED6 inclined by the angle $\theta_d$ with respect to the X-axis around the bending point. The fifth extension direction ED5 is located in the fourth quadrant on the XY coordinate plane, and the sixth extension direction ED6 is located in the third quadrant on the XY coordinate plane. On the other hand, the second electrode E22a is extended in the seventh extension direction ED7 inclined by the angle $\theta_a$ with respect to the Y-axis and in the eighth extension direction ED8 inclined by the angle $\theta_c$ with respect to the Y-axis around the bending point. The seventh extension direction ED7 is located in the fourth quadrant on the XY coordinate plane, and the eighth extension direction ED8 is located in the first quadrant.

FIG. 14C shows patterns of the first electrodes E11a and E21a and the second electrodes E12a and E22a when the first liquid crystal cell 10a shown in FIG. 14A and the second liquid crystal cell 20a shown in FIG. 14B are stacked and bonded together. Referring to FIG. 14C, the first electrode E11a and the second electrode E12a of the first liquid crystal cell 10a shown in FIG. 14A and the first electrode E21a and the second electrode E22a of the second liquid crystal cell 20a shown in FIG. 14B are not overlapped with each other in a completely coincident manner. That is, they are overlapped in a state in which at least a part thereof is shifted from each other. As described with reference to FIG. 14B, here, the second liquid crystal cell 20a is inverted about the X-axis and is arranged such that the second substrate S22 of the second liquid crystal cell 20a and the second substrate S12 of the first liquid crystal cell 10a face each other via the first transparent adhesive layer TA1. In contrast to FIG. 13C, in FIG. 14C, the third extension direction ED3 of the second electrode E12a of the first liquid crystal cell 10a and the eighth extension direction ED8 of the second electrode E22a of the second liquid crystal cell 20a belong to the same first quadrant. However, the second electrode E12a of the first liquid crystal cell 10a extending in the third extension direction ED3 and the second electrode E22a of the second liquid crystal cell 20a extending in the eighth extension direction ED8 do not overlap each other in a completely matched state because the angle $\theta_a$ formed by the third extension direction ED3 and the Y-axis and the angle $\theta_c$ formed by the eighth extension direction ED8 and the Y-axis differ from each other ($\theta_a \neq \theta_c$). That is, they are overlapped in a state in which at least a part thereof is shifted from each other.

Similarly, in FIG. 14C, the fourth extension direction ED4 of the second electrode E12a of the first liquid crystal cell 10a and the seventh extension direction ED7 of the second electrode E22a of the second liquid crystal cell 20a belong to the same fourth quadrant. However, since the angle $\theta_c$ formed by the fourth extension direction ED4 and the Y-axis and the angle $\theta_a$ formed by the seventh extension direction ED7 and the Y-axis differ from each other ($\theta_a \neq \theta_c$), the second electrode E12a of the first liquid crystal cell 10a extending in the fourth extension direction ED4 and the second electrode E22a of the second liquid crystal cell 20a extending in the seventh extension direction ED7 do not overlap each other in a completely matched state. That is, they are overlapped in a state in which at least a part thereof is shifted from each other. As described above, in the case where the second liquid crystal cell 10a having the same configuration as that of the first liquid crystal cell 20a is inverted about the X-axis and overlapped with the first liquid crystal cell 10a, it is possible to prevent each electrode from being overlapped in complete match with each other in the case where the extension directions of the electrode patterns of the second electrode E12a of the first liquid crystal cell 10a and the second electrode E22a of the second liquid crystal cell 20a and the Y-axis are different from each other. As a result, it is possible to prevent the occurrence of moire by preventing interference. Here, the angles between the Y-axis and the extension direction of the electrode pattern of the second electrode E12a of the first liquid crystal cell 10a and between the Y-axis and extension direction of the electrode pattern of the second electrode E22a of the second liquid crystal cell 20a are preferably different by 1° or more.

Referring to FIG. 13A to FIG. 13C and FIG. 14A to FIG. 14C, in the case where each electrode pattern has a dogleg shape, if the extension directions of the electrode patterns of the second electrode E12a of the first liquid crystal cell 10a and the second electrode E22a of the second liquid crystal cell 20a are different from each other, or if the angles of the electrode patterns of the second electrode E12a of the first liquid crystal cell 10a and the second electrode E22a of the second liquid crystal cell 20a with the Y-axis are different from each other, it is possible to prevent each electrode from being overlapped completely coincident with each other. As a result, it is possible to prevent the occurrence of moire by preventing interference. In addition, this is applied to the case where the first liquid crystal cell 10a and the second liquid crystal cell 20a having the same configuration as the first liquid crystal cell 10a are overlapped by inverting about the X-axis.

Unlike the examples shown in FIG. 13A to FIG. 13C and FIG. 14A to FIG. 14C, in the case where the first liquid crystal cell 10a and the second liquid crystal cell 20a are arranged so as to overlap each other, it is assumed that the second liquid crystal cell 20a is inverted about the Y-axis and arranged so as to overlap the first liquid crystal cell 10a. In the case where the second liquid crystal cell 20a is inverted about the Y-axis and arranged so as to overlap the first liquid crystal cell 10a, the condition opposite to the conditions described with reference to FIG. 13A to FIG. 13C and FIG. 14A to FIG. 14C is satisfied, thereby interference can be prevented to prevent the occurrence of moire. In other words, if the extension directions of the electrode patterns of the first electrode E11a of the first liquid crystal cell 10a and the first electrode E21a of the second liquid crystal cell 20a are different, or if the angles formed by the extension directions of the electrode patterns of the first electrode E11a of the first liquid crystal cell 10a and the first electrode E21a of the second liquid crystal cell 20a with the X-axis are different from each other, it is possible to prevent the electrodes from overlapping each other in a completely matched state in the case where the second liquid crystal cell 20a is inverted about the Y-axis and arranged so as to overlap the first liquid crystal cell 10a, and to prevent the generation of moire by preventing interference.

Hereinabove, in the present embodiment, the first liquid crystal cell 10a and the second liquid crystal cell 20a have been described in which the patterns of the first electrodes E11a and E21a and the second electrodes E12a and E22a have a zig-zag shape or a dogleg shape. However, in the present embodiment, the shape of each electrode pattern is not limited to these, and various shapes can be applied.

For example, each pattern of the first electrodes E11a and E21a and the second electrodes E12a and E22a have a wave shape. In such cases, if the shapes of the patterns have symmetrical shapes, the electrodes overlap each other when overlapping the first liquid crystal cell 10a and the second liquid crystal cell 20a, and interferences may occur. Therefore, in the case where each pattern has the wave shape, it is preferable that each pattern has an asymmetric shape with respect to a predetermined axis, such as randomizing a size of the wave. In addition, a pattern of each of the first electrodes E11a and E21a and the second electrodes E12a and E22a may have an arc shape.

In addition, a pattern of each of the first electrodes E11a and E21a and the second electrodes E12a and E22a may have a concentric circular shape. In such cases, if the shape of each pattern has a symmetrical shape, the electrodes overlap each other when overlapping the first liquid crystal cell 10a and the second liquid crystal cell 20a, and interferences may occur. Therefore, in the case where each of the electrode patterns has a concentric circular shape, it is preferable that the circular shape is distorted or the circular shape is rotationally asymmetric in each of the electrode patterns so as to be asymmetric in the bonding direction.

Modifications

Although the embodiments of the present invention have been described above, the embodiments of the present invention described above can be modified into various forms as follows. Further, the first embodiment, the second embodiment, and the modification described below can be applied in combination with each other.

Modification 1

In the schematic plan view showing the first electrode E11, the second electrode E12, the first electrode E21, and the second electrode E22 according to the first embodiment described with reference to FIG. 7B, when the first liquid crystal cell 10 and the second liquid crystal cell 20 are overlapped, the second liquid crystal cell 20 in which the second liquid crystal cell 20 is inverted with the Y-direction as an axis is overlapped with the first liquid crystal cell 10. Similarly, in the schematic plan view showing the first electrode E11a, the second electrode E12a, the first electrode E21a, and the second electrode E22a according to the second embodiment described with reference to FIG. 9B, when the first liquid crystal cell 10a and the second liquid crystal cell 20a are overlapped, the second liquid crystal cell 20a in which the second liquid crystal cell 20a is inverted with the Y-direction as an axis is overlapped with the first liquid crystal cell E11a. However, a method of overlapping the first liquid crystal cell and the second liquid crystal cell is not limited thereto. Hereinafter, a variation of overlap methods of the first liquid crystal cell and the second liquid crystal cell will be described with reference to the drawings.

Figure 15:
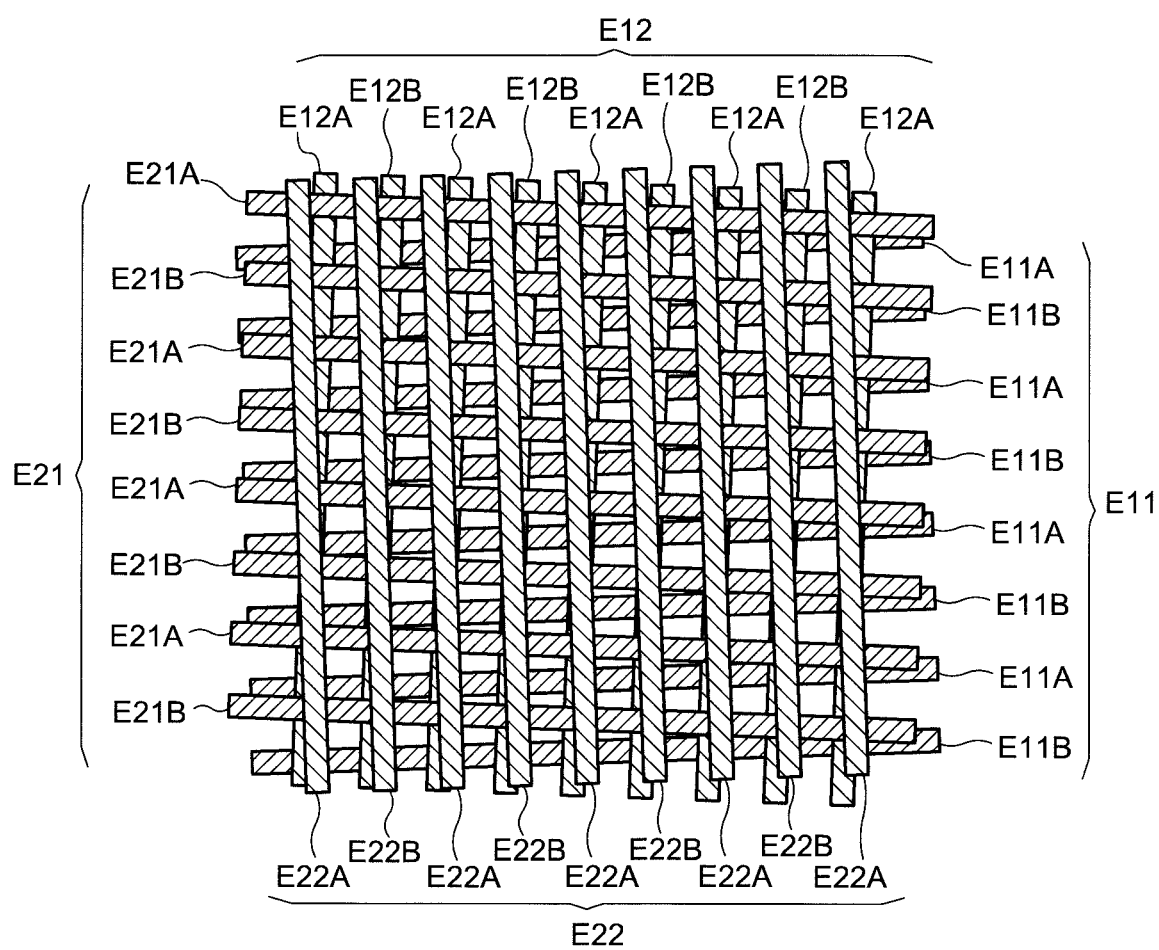
FIG. 15 is a schematic plan view showing an example of patterns of electrodes respectively arranged in a first liquid crystal cell and a second liquid crystal cell constituting a liquid crystal optical element according to an embodiment of the present disclosure.

FIG. 15 is an example of a schematic plan view showing each electrode in a case where the first liquid crystal cell and the second liquid crystal cell are arranged so as to stack each other, that is, in a case where the first liquid crystal cell and the second liquid crystal cell are arranged so as to overlap each other. The first liquid crystal cell and the second liquid crystal cell shown in FIG. 15 have the same configuration as the first liquid crystal cell 10 and the second liquid crystal cell 20 in the optical device 100 in the first embodiment described above.

In FIG. 15 shows the respective electrode pattern in the case where the first substrates S21 of the second liquid crystal cell 20 is arranged so that a surface on a side opposite to a side on which the first electrodes E21 is arranged face to a surface on a side opposite to a surface on a side where the second electrodes E12 of the second electrodes 12 of the first liquid crystal cell 10 is arranged, further is rotated 90 degree to be overlapped with the first liquid crystal cell 10 via the first transparent bonding layer TA1 (not shown) when the first liquid crystal cell 10 and the second liquid crystal cell 20 are arranged in an overlapping manner.

As shown in FIG. 15, the extension directions of the pattern of the first electrode E11 (first pattern) and the pattern of the second electrode E12 (second pattern) in the first liquid crystal cell 10 and the extension directions of the pattern of the first electrode E21 (first pattern) and the pattern of the second electrode E22 (second pattern) in the second liquid crystal cell 20 are different from each other. Therefore, when the first liquid crystal cell 10 and the second liquid crystal cell 20 are overlapped, the second liquid crystal cell 20 is rotated by 90° instead of being inverted, so that it is possible to prevent the electrodes in the first liquid crystal cell 10 and the second liquid crystal cell 20 from being overlapped in a state in which the extension directions of the electrodes are completely matched.

Although the first liquid crystal cell and the second liquid crystal cell shown in FIG. 15 are same as the first liquid crystal cell 10 and the second liquid crystal cell 20 in the optical device 100 in the first embodiment described above, FIG. 15 is also applicable to the first liquid crystal cell 10a and the second liquid crystal cell 20a in the optical device 100a in the second embodiment.

FIG. 16A to FIG. 16D are schematic views for showing variations in overlap manners of the first liquid crystal cell 10 and the second liquid crystal cell 20. In FIG. 16A to FIG. 16D, a plan view and a cross-sectional view of a substrate (the first substrate S11 and the second substrate S12) of the first liquid crystal cell 10 and the substrate (the first substrate S21 and the second substrate S22) of the second liquid crystal cell 20, respectively are shown, and a plan view and a cross-sectional view when the first liquid crystal cell 10 and the second liquid crystal cell 20 are overlapped with each other. Here, when the first liquid crystal cell and the second liquid crystal cell 20 are overlapped, the second liquid crystal cell 20 is inverted and arranged on the upper side of the first liquid crystal cell 10.

Figure 16A:
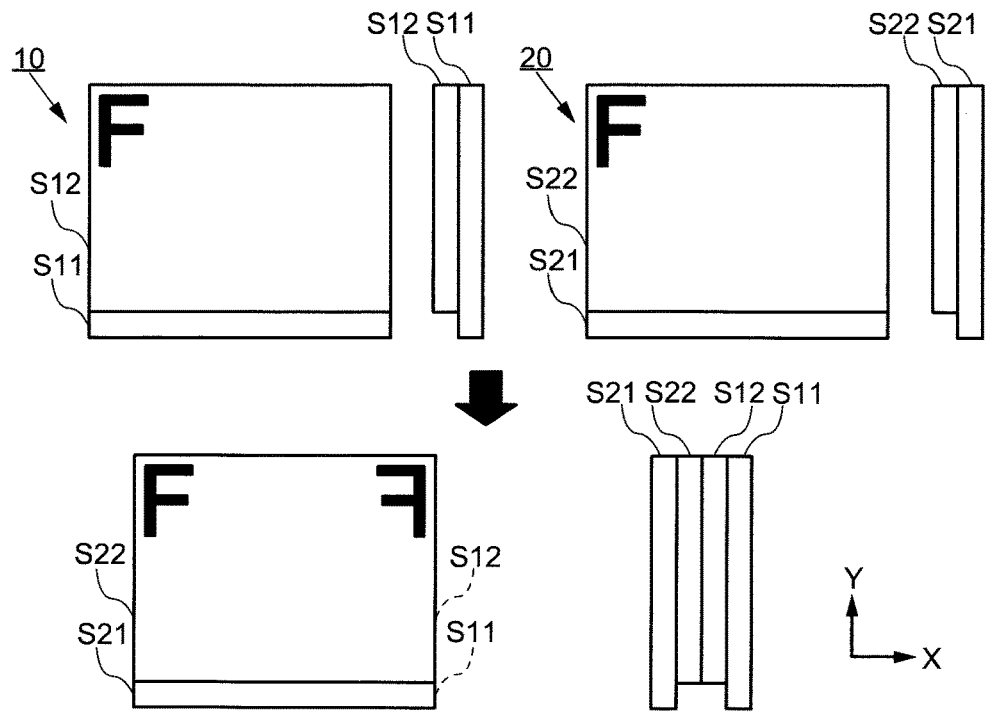
FIG. 16A is a schematic view showing a variation in how a first liquid crystal cell and a second liquid crystal cell are stacked.

In the same manner as in FIG. 7B and FIG. 9B, FIG. 16A shows an example where the second liquid crystal cell 20 in which the second liquid crystal cell 20 is inverted with the Y-direction as an axis is overlapped with the first liquid crystal cell 10 when the first liquid crystal cell 10 and the second liquid crystal cell 20 are overlapped with each other.

Figure 16B:
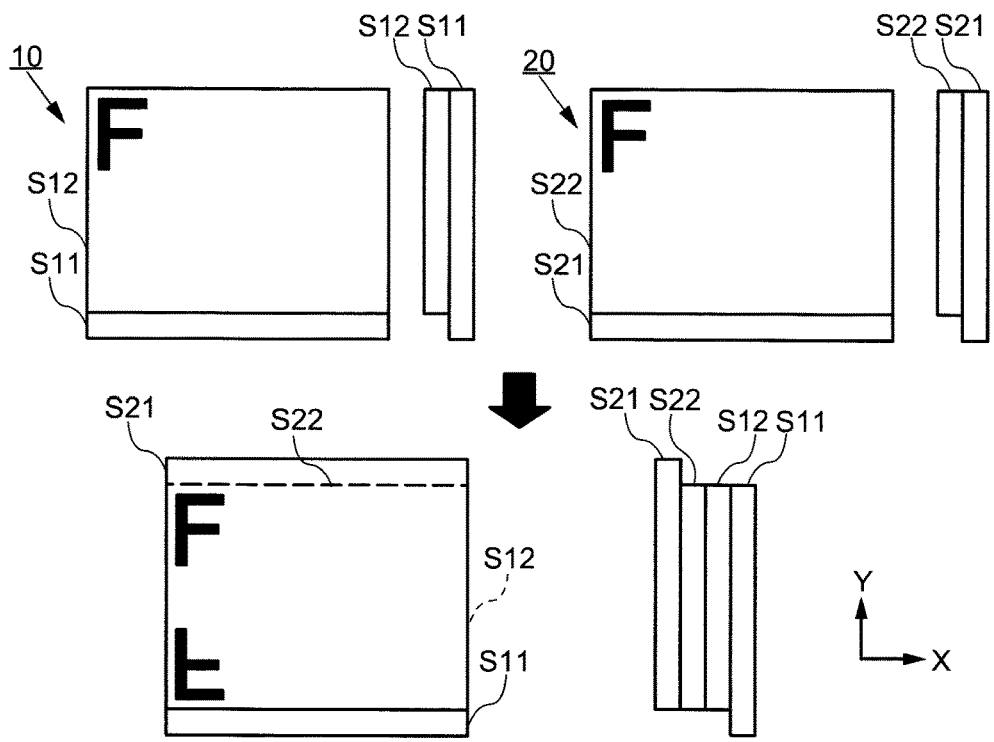
FIG. 16B is a schematic view showing a variation in how a first liquid crystal cell and a second liquid crystal cell are stacked.

FIG. 16B shows an example where the second liquid crystal cell 20 in which the second liquid crystal cell 20 is inverted with the X-direction as an axis is overlapped with the first liquid crystal cell 10 when the first liquid crystal cell and the second liquid crystal cell 20 are overlapped with each other.

Figure 16C:
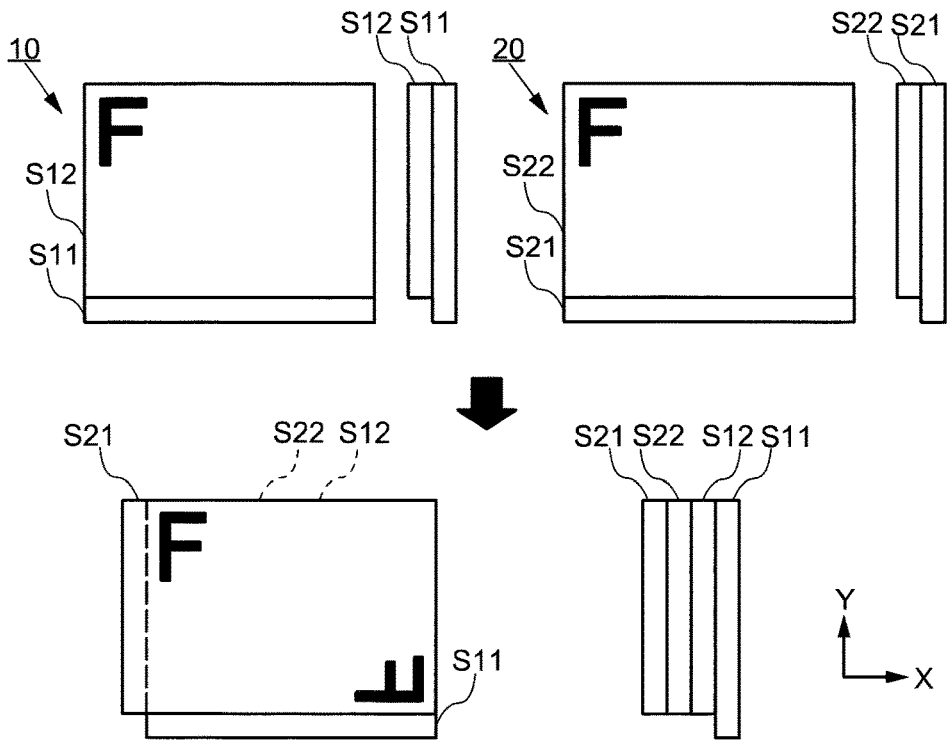
FIG. 16C is a schematic view showing a variation in how a first liquid crystal cell and a second liquid crystal cell are stacked.
Figure 16D:
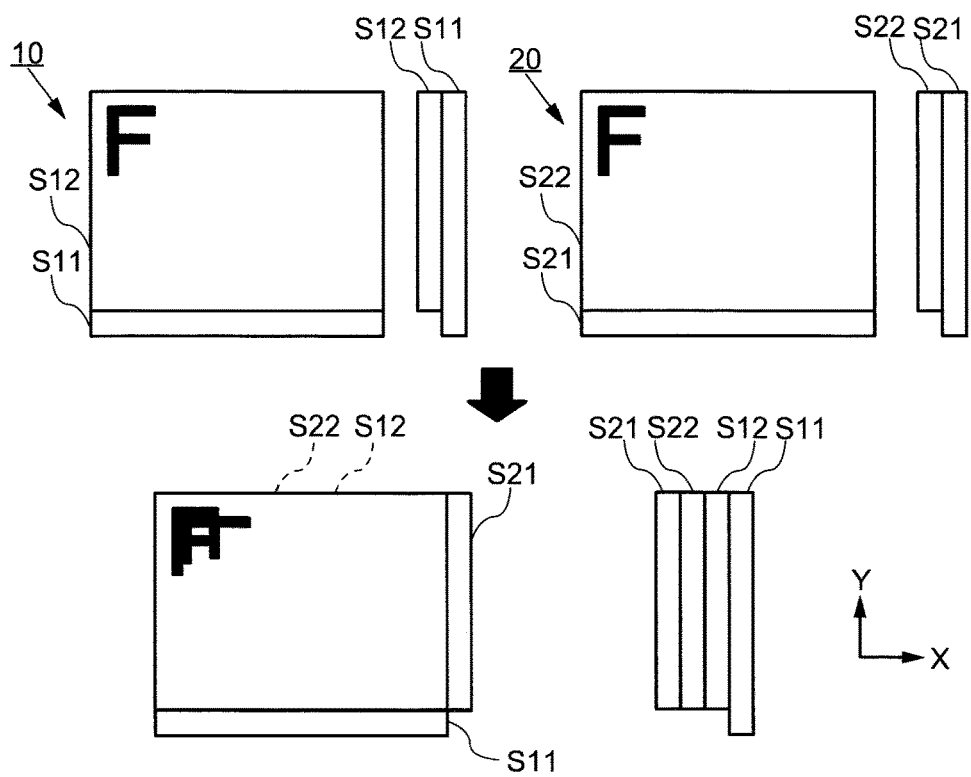
FIG. 16D is a schematic view showing a variation in how a first liquid crystal cell and a second liquid crystal cell are stacked.

FIG. 16C shows an example where the second liquid crystal cell 20 is inverted with the Y-direction as an axis, and the second liquid crystal cell 20 rotated by 90° is overlapped with the first liquid crystal cell 10 when the first liquid crystal cell 10 and the second liquid crystal cell 20 are overlapped. FIG. 16D shows an example where the second liquid crystal cell 20 is inverted with the X-direction a s an axis, and the second liquid crystal cell 20 rotated by 90° is overlapped with the first liquid crystal cell 10 when the first liquid crystal cell 10 and the second liquid crystal cell 20 are overlapped.

Modification 2

The optical devices 100 and 100a according to the above embodiments are composed of two liquid crystal cells, that is, the first liquid crystal cells 10 and 10a and the second liquid crystal cells 20 and 20a. However, a number of liquid crystal cells constituting the optical device is not limited to two.

Figure 17:
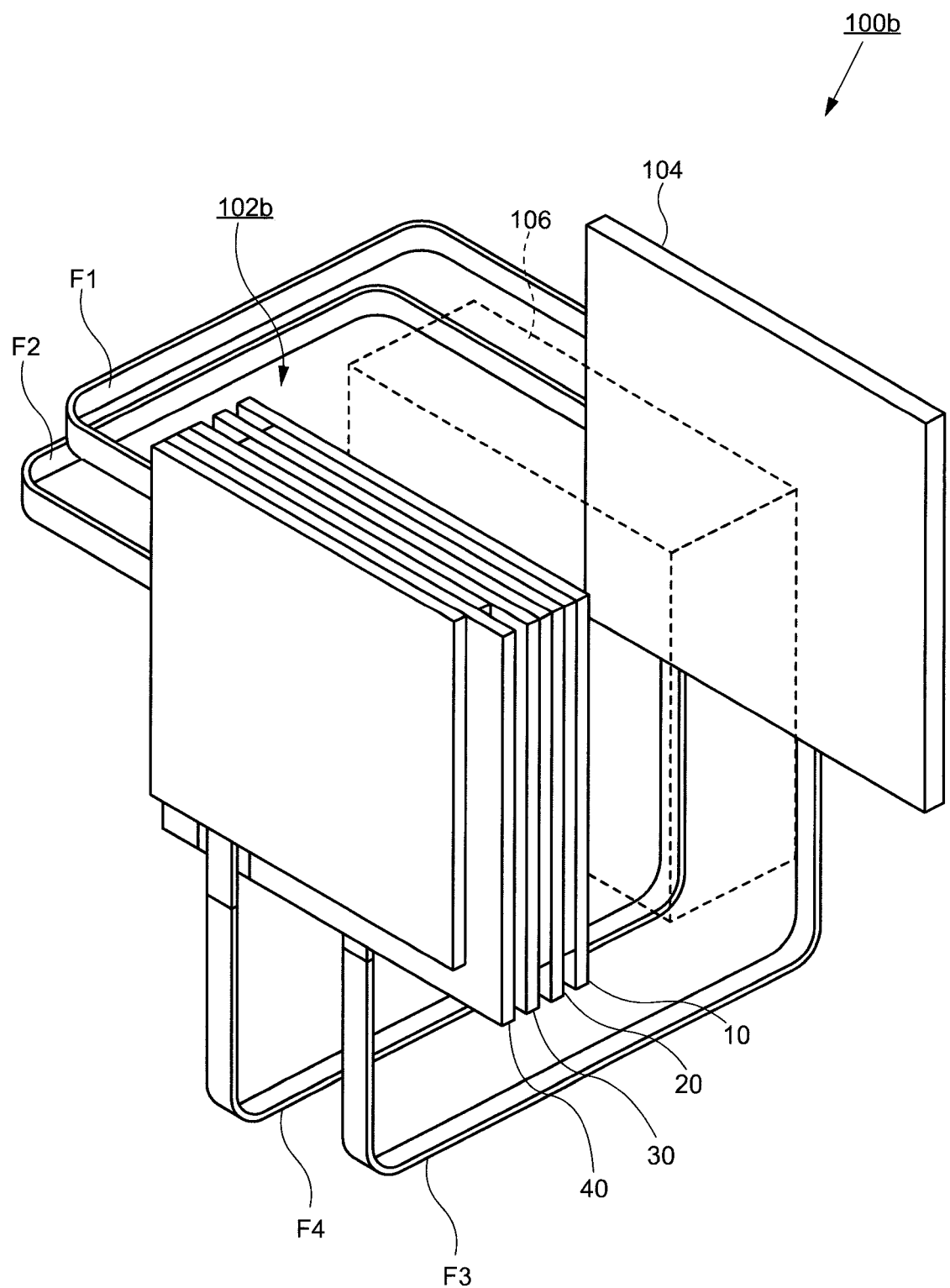
FIG. 17 is a perspective view of an optical device according to a modification of the present disclosure.

FIG. 17 is a perspective view of an optical device 100b according to a modification of the present disclosure. The optical device 100b includes a liquid crystal optical element 102b and a circuit board 104. The liquid crystal optical element 102b includes four liquid crystal cells.

The liquid crystal optical element 102b includes the first liquid crystal cell 10, the second liquid crystal cell 20, a third liquid crystal cell 30, and a fourth liquid crystal cell 40. A configuration of the liquid crystal optical element 102b excluding the third liquid crystal cell 30 and the fourth liquid crystal cell is substantially the same as that of the liquid crystal optical element 102 described in the first embodiment. Therefore, the third liquid crystal cell 30 and the fourth liquid crystal cell 40 will be mainly described below, and redundant description of other configurations will be omitted.

The third liquid crystal cell 30 and the fourth liquid crystal cell 40 are panels having flat shapes like the first liquid crystal cell 10 and the second liquid crystal cell 20. Flat plate surfaces of the respective liquid crystal cells 30 and 40 are arranged so as to overlap each other. The third liquid crystal cell 30 is arranged so as to overlap the flat surface of the second liquid crystal cell 20. Transparent adhesive layers not shown is arranged between the second liquid crystal cell 20 and the third liquid crystal cell 30 and between the third liquid crystal cell 30 and the fourth liquid crystal cell 40.

The third liquid crystal cell 30 is connected to the circuit board 104 via a third flexible circuit board F3, and the fourth liquid crystal cell 40 is connected to the circuit board 104 via a fourth flexible circuit board F4.

Referring to FIG. 17, in the optical device 100b, the light source unit 106 is arranged on a back side of the liquid crystal optical element 102b. The optical device 100b is configured such that the light emitted from the light source unit 106 is emitted to the front side of the drawing through the liquid crystal optical element 102b. In the liquid crystal optical element 102b, the first liquid crystal cell 10, the second liquid crystal cell 20, the third liquid crystal cell 30, and the fourth liquid crystal cell 40 are arranged in this order from the light source unit 106.

Figure 18:
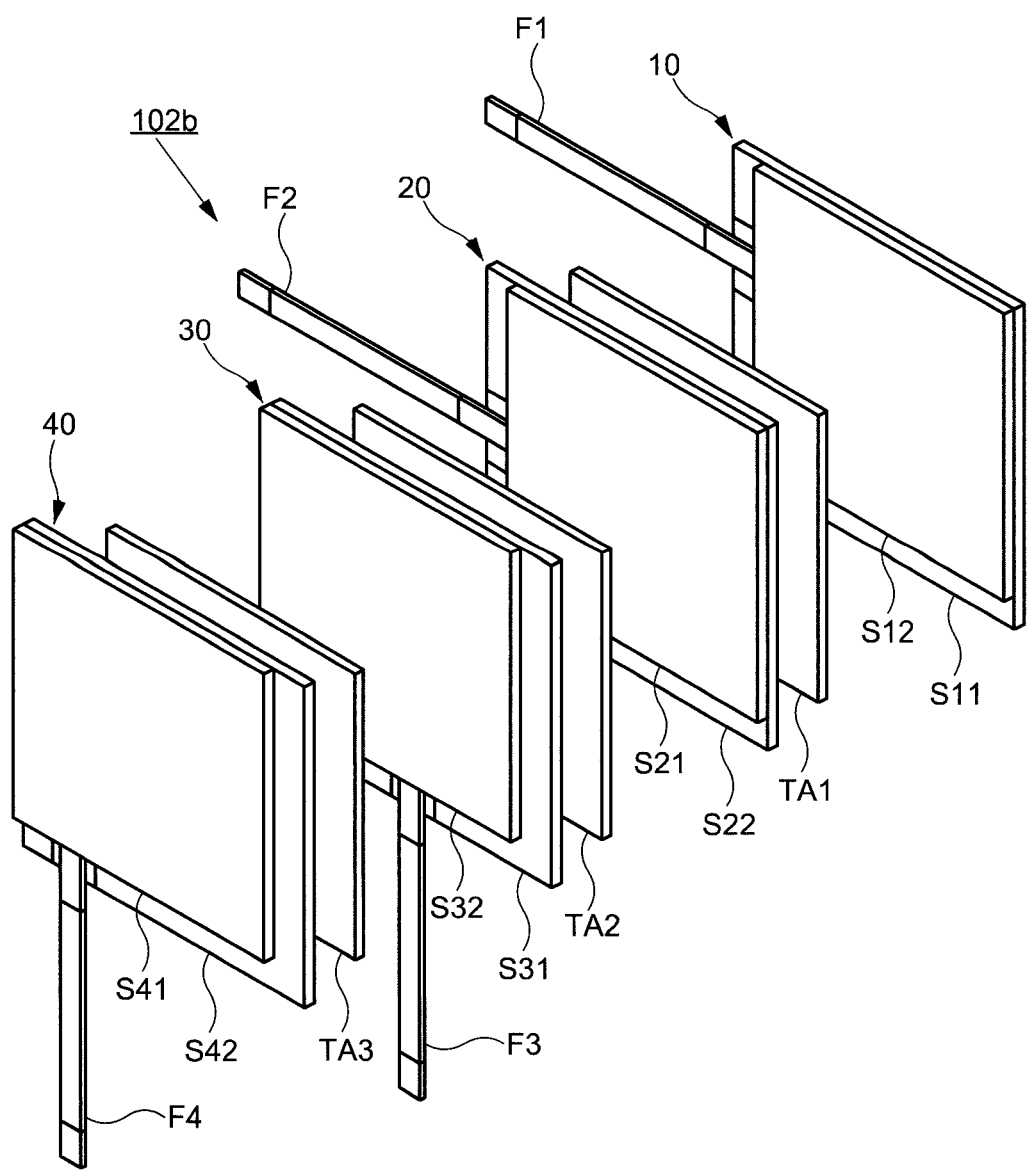
FIG. 18 is an exploded view of liquid crystal optical elements constituting an optical device according to the modification of the present disclosure.

FIG. 18 is an exploded view of the liquid crystal optical element 102b shown in FIG. 17. The liquid crystal optical element 102b includes the first liquid crystal cell 10, the second liquid crystal cell 20, the third liquid crystal cell 30, and the fourth liquid crystal cell 40.

The third liquid crystal cell 30 includes a first substrate S31, a second substrate S32, and the third flexible circuit board F3, and has the same configuration as that of the first liquid crystal cell 10. The fourth liquid crystal cell 40 includes a first substrate S41, a second substrate S42, and the fourth flexible circuit board F4, and has the same configuration as the first liquid crystal cell 10.

A second transparent adhesive layer TA2 is arranged between the second liquid crystal cell 20 and the third liquid crystal cell 30. The second transparent adhesive layer TA2 transmit visible light and adhere the first substrate S21 of the second liquid crystal cell 20 to the first substrate S31 of the third liquid crystal cell 30. The third transparent adhesive layer TA3 is arranged between the third liquid crystal cell and the fourth liquid crystal cell 40. The third transparent adhesive layer TA3 transmit visible light and adhere the second substrate S32 of the third liquid crystal cell 30 to the second substrate S42 of the fourth liquid crystal cell 40.

Like the first transparent adhesive layer TA1, the second transparent adhesive layer TA2 and the third transparent adhesive layer TA3 preferably have high transmittances and refractive indexes close to the first substrates S21, S31 and S41 and the second substrates S22, S32 and S42. As the second transparent adhesive layer TA2 and the third transparent adhesive layer TA3, an optically elastic resin can be used, and for example, an adhesive including a translucent acrylic resin can be used. Further, since a temperature of the liquid crystal optical element 102b rises due to the heat radiated from the light source unit 106, thermal expansion coefficients of the second transparent adhesive layer TA2 and the third transparent adhesive layer TA3 are preferably close to thermal expansion coefficients of the first substrate and the second substrate.

However, since the thermal expansion coefficients of the second transparent adhesive layer TA2 and the third transparent adhesive layer TA3 are, for example, often higher than that of a glass-substrate, it is necessary to consider stress relaxation when the temperature rises. Thicknesses of the second transparent adhesive layer TA2 and the third transparent adhesive layer TA3 are preferably thicker than the cell gap (the thicknesses of the liquid crystal layer) of the respective liquid crystal cells (the second liquid crystal cell 20, the third liquid crystal cell 30, and the fourth liquid crystal cell 40) in order to alleviate thermal stresses in the case of temperature rise.

As described above, the third liquid crystal cell 30 and the fourth liquid crystal cell 40 have substantially the same structure as the first liquid crystal cell 10 and the second liquid crystal cell 20. In the liquid crystal optical element 102b of the present example, the third liquid crystal cell 30 and the fourth liquid crystal cell 40 have a structure in which they are overlapped with the first liquid crystal cell 10 and the second liquid crystal cell 20 in a state that they are rotated within a range of 90±10° relative to the first liquid crystal cell and the second liquid crystal cell 20. In other words, in the case where the arrangement of the first liquid crystal cell 10 and the second liquid crystal cell 20 is used as a reference, the third liquid crystal cell 30 and the fourth liquid crystal cell 40 are arranged in a state of being rotated in a range of 90±10°. On the other hand, in the case where the third liquid crystal cell 30 and the fourth liquid crystal cell 40 are used as a reference, the first liquid crystal cell 10 and the second liquid crystal cell 20 are arranged in a state of being rotated in a range of 90±10°. By stacking a plurality of liquid crystal cells having the same electrode pattern and rotating a part of the liquid crystal cells therein, an electrode arrangement can be changed, and a diffusion of light passing through the stacked liquid crystal cells can be changed.

Figure 19:
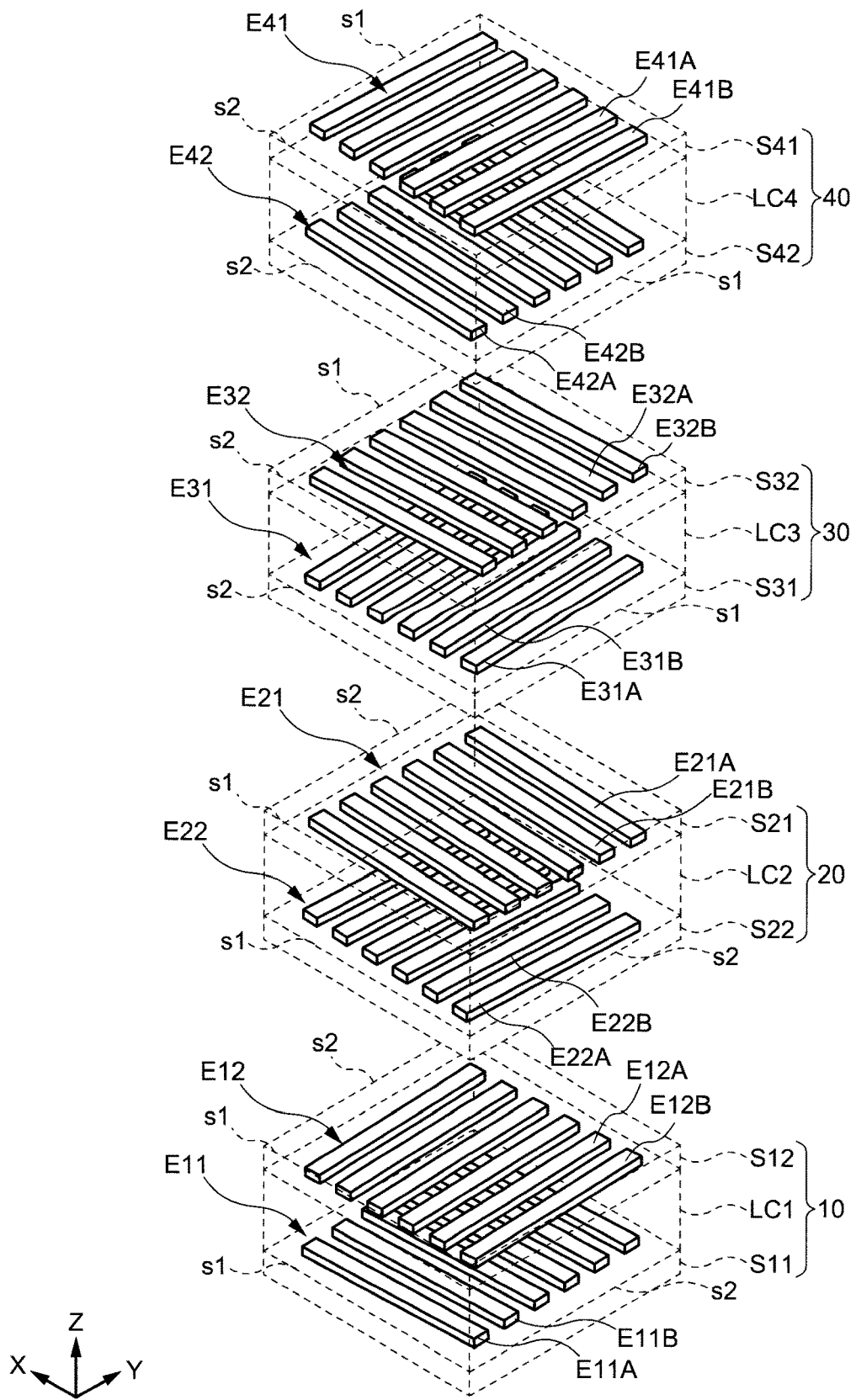
FIG. 19 is a perspective view showing an arrangement of electrodes of a first liquid crystal cell, a second liquid crystal cell, a third liquid crystal cell, and a fourth liquid crystal cell constituting a liquid crystal optical element according to the modification of the present disclosure.

FIG. 19 is a perspective view showing an arrangement of electrodes arranged in each of the first liquid crystal cell 10, the second liquid crystal cell 20, the third liquid crystal cell 30, and the fourth liquid crystal cell 40. The first liquid crystal cell 10 and the second liquid crystal cell 20 are the same as those in the first embodiment, and therefore redundant description thereof will be omitted.

The third liquid crystal cell 10 includes the first substrate S31 and the second substrate S32, and a third liquid crystal layer LC3 between the first substrate S31 and the second substrate S32. Each of the first substrate S31 and the second substrate S32 may have a rectangle shape having a pair of sides (first side s2) parallel to the X-axis direction (first direction) and a pair of sides (second side s1) parallel to the Y-axis direction (second direction) perpendicular to the X-axis direction. The first substrate S31 is arranged with a first electrode E31 on a side facing the third liquid crystal layer LC3, and the second substrate S32 is arranged with a second electrode E32 on a side facing the third liquid crystal layer LC3. The first electrode E31 and the second electrode E32 are arranged to face each other with the third liquid crystal layer LC3 interposed therebetween.

The second electrode E31 includes a plurality of first branch electrodes E31A and a plurality of second branch electrodes E31B each having a first pattern linearly extending in a direction inclined by a predetermined angle with respect to the Y-axis direction (second direction). The extension direction of the plurality of first branch electrodes E31A and the plurality of second branch electrodes 32B may be inclined by 0.5±1° or more and 10±1° or less with respect to the Y-axis direction. Preferably, the plurality of first branch electrodes E31A and the plurality of second branch electrodes E31B may be inclined by 0.5±1° or more and 5±1° or less with respect to the Y-axis. The second electrode E32 includes a plurality of third branch electrodes E32A and a plurality of fourth branch electrodes E32B having a second pattern linearly extending in a direction inclined by a predetermined angle with respect to the X-axis direction (first direction). The extension direction of the plurality of third branch electrodes E31A and the plurality of fourth branch electrodes E31B may be inclined by 0.5±1° or more and 10±1° or less with respect to the X-axis direction. Preferably, the plurality of third branch electrodes E32A and the plurality of fourth branch electrodes E32B may be inclined by 0.5±1° or more and 5±1° or less with respect to the X-axis. The plurality of first branch electrodes E31A and the plurality of second branch electrodes E31B are alternately arranged, and the plurality of third branch electrodes 32A and the plurality of fourth branch electrodes E32B are alternately arranged.

In FIG. 19, the X, Y, and Z-axis directions are shown for the purpose of explanation. The first liquid crystal cell 10, the second liquid crystal cell 20, the third liquid crystal cell 30, and the fourth liquid crystal cell 40 are arranged so as to stack each other in the Z-axis direction. Similar to the first liquid crystal cell 10 and the second liquid crystal cell 20, in the third liquid crystal cell 30, extension direction of the first branch electrodes E31A and the second branch electrodes E31B is inclined at a predetermined angle with respect to the Y-axis direction, and extension direction of the third branch electrodes 32A and the fourth branch electrodes E32B is inclined at a predetermined angle with respect to the X-axis direction. That is, the plurality of first branch electrodes E31A and the plurality of second branch electrodes E31B and the plurality of third branch electrodes E32A and the plurality of fourth branch electrodes E32B are arranged to intersect each other so as not to be perpendicular to each other.

The fourth liquid crystal cell 40 includes the first substrate S41 and the second substrate S42, and a fourth liquid crystal layer LC4 between the first substrate S41 and the second substrate S42. On the first substrate S41, a surface facing the fourth liquid crystal layer LC4 is arranged with a first electrode E41, and on the second substrate S42, a surface facing to the fourth liquid crystal layer LC4 is arranged with a second electrode E42. The first electrode E41 includes a plurality of first branch electrodes E41A and a plurality of second branch electrodes E41B having a first pattern linearly extending in a direction inclined by a predetermined angle with respect to the Y-axis direction (second direction). The extension direction of the plurality of first branch electrodes E41A and the plurality of second branch electrodes E41B may be inclined by 0.5±1° or more and 10±1° or less with respect to the Y-axis direction. Preferably, the plurality of first branch electrodes E41A and the plurality of second branch electrodes E41B may be inclined by 0.5±1° or more and 5±1° or less with respect to the Y-axis. The second electrode E42 includes a plurality of third branch electrodes E42A and a plurality of fourth branch electrodes E42B having a second pattern linearly extending in a direction inclined by a predetermined angle with respect to the X-axis direction (first direction). The extension direction of the plurality of third branch electrodes E42A and the plurality of fourth branch electrodes E42B may be inclined by 0.5±1° or more and 10±1° or less with respect to the X-axis direction. Preferably, the plurality of third branch electrodes E42A and the plurality of fourth branch electrodes E42B may be inclined by 0.5±1° or more and 5±1° or less with respect to the X-axis.

In the fourth liquid crystal cell 40, the plurality of first branch electrodes 41A and the plurality of second branch electrodes E41B are alternately arranged, and the plurality of third branch electrodes 42A and the plurality of fourth branch electrodes E42B are alternately arranged. As described above, in the fourth liquid crystal cell 40, extension direction of the plurality of first branch electrodes 41A and the plurality of second branch electrodes E41B is inclined at a predetermined angle with respect to the Y-axis direction, and extension direction of the plurality of third branch electrodes 42A and the plurality of fourth branch electrodes E42B is inclined at a predetermined angle with respect to the X-axis direction. That is, the plurality of first branch electrodes E41A and the plurality of second branch electrodes E41B and the plurality of third branch electrodes E42A and the plurality of fourth branch electrodes E42B are arranged to intersect each other so as not to be perpendicular to each other.

The liquid crystal optical element 102b includes the first liquid crystal cell 10, the second liquid crystal cell 20, the third liquid crystal cell 30, and the fourth liquid crystal cell 40 that are stacked in the Z-axis direction. In the first liquid crystal cell 10, the second liquid crystal cell 20, the third liquid crystal cell 30, and the fourth liquid crystal cell 40, the first substrates S11, S21, S31 and S41 have the same configurations, and the second substrates S12, S22, S32 and S42 have the same configurations. The first electrode E11 and the second electrode E12 arranged in the first liquid crystal cell 10, the first electrode E21 and the second electrode E22 arranged in the second liquid crystal cell 20, the first electrode E31 and the second electrode E32 arranged in the third liquid crystal cell 30, and the first electrode E41 and the second electrode E42 arranged in the fourth liquid crystal cell 40 have substantially the same size in a plan view.

The second liquid crystal cell 20 and the third liquid crystal cell 30 are arranged such that the first substrate S21 of the second liquid crystal cell 20 faces the first substrate S31 of the third liquid crystal cell 30 via the second transparent adhesive layer TA2 shown in FIG. 18. Specifically, the first substrate S21 of the second liquid crystal cell 20 is arranged such that a surface (outer surface) opposite to a surface of a side on which the first electrode E21 is arranged faces a surface (outer surface) opposite to a surface on which the first electrode E31 of the first substrate 31 of the third liquid crystal cell 30 is arranged via the second transparent adhesive layer TA2.

The third liquid crystal cell 30 and the fourth liquid crystal cell 40 are arranged such that the second substrate S42 of the fourth liquid crystal cell 40 faces the second substrate S32 of the third liquid crystal cell 30 via the third transparent adhesive layer TA3 shown in FIG. 18. Specifically, the second substrate S32 of the third liquid crystal cell 30 is arranged such that a surface (outer surface) opposite to a surface of a side on which the first electrode E32 is arranged faces a surface (outer surface) opposite to a surface on which the first electrode E42 of the second substrate 42 of the fourth liquid crystal cell 40 is arranged via the third transparent adhesive layer TA3.

As described above, in the liquid crystal optical element 102b of the present example, the third liquid crystal cell 30 and the fourth liquid crystal cell 40 are overlapped with the first liquid crystal cell 10 and the second liquid crystal cell 20 while being rotated by 90±10° with respect to the first liquid crystal cell 10 and the second liquid crystal cell 20. Therefore, although in the first liquid crystal cell 10 and the second liquid crystal cell 20, the first electrodes E11 and E21 *are inclined by* 0.5±1° or more and 10±1° or less with respect to the X-axis direction, in the third liquid crystal cell 30 and the fourth liquid crystal cell 40, the first electrodes E31 and E41 is inclined by 0.5±1° or more and 10±1° or less with respect to the Y-axis direction. Similarly, although in the first liquid crystal cell 10 and the second liquid crystal cell 20, the second electrodes E12 and E22 are inclined by 0.5±1° or more and 10±1° or less with respect to the Y-axis direction, in the third liquid crystal cell 30 and the fourth liquid crystal cell 40, the second electrodes E32 and E42 are inclined by 0.5±1° or more and 10±1° or less with respect to the X-axis direction.

Although not shown in FIG. 19, the light source unit 106 is arranged on the lower side of the first liquid crystal cell 10. The light emitted from the light source unit 106 and entering the liquid crystal optical element 102b passes through all of the first liquid crystal cell 10, the second liquid crystal cell 20, the third liquid crystal cell 30, and the fourth liquid crystal cell 40, and is emitted. In addition, in this modification, diffusion of a polarization component having a first polarization axis is mainly controlled by the first liquid crystal cell 10 and the second liquid crystal cell 20, and diffusion of a polarization component having a second polarization axis perpendicular to the first polarization axis is mainly controlled by the third liquid crystal cell 30 and the fourth liquid crystal cell 40.

Figure 20:
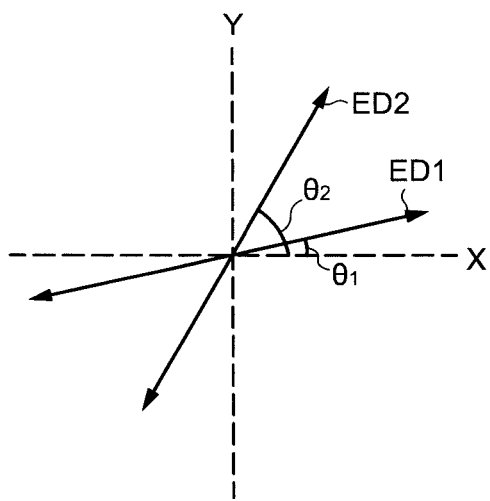
FIG. 20 is a schematic view for explaining an angle formed on an XY coordinate plane in extension directions of patterns of electrodes in liquid crystal cells constituting a liquid crystal optical element according to the modification of the present disclosure.

FIG. 20 is a schematic view for explaining angles formed by the extension direction of the pattern of the first electrodes E11, E21, E31 and E41 arranged on the first substrates S11, S21, S31 and S41 and the extension direction of the pattern of the second electrodes E12, E22, E32 and E42 arranged on the second substrates S12, S22, S32 and S42 are from each other in the liquid crystal cells 10, 20, 30, and 40 on the XY coordinate plane. In FIG. 20, the extension direction of the first electrode pattern is shown as ED1, and the extension direction of the second electrode pattern is shown as ED2 when the first substrates and the second substrates are overlapped. The angle formed by the extension direction ED1 and the X-axis is $\theta_1$, and an angle formed by the extension direction ED2 and the X-axis is 62.

In this example, in the case where $|\theta_1| \neq |90-\theta_2|$ is satisfied, it is possible to prevent the electrode patterns from overlapping each other, thereby prevent interference and reduce the occurrence of moire. In the case where a difference between $|\theta_1|$ and $|90-\theta_2|$ is preferably 1° or more. For example, Angle formed by the extension direction of the first electrodes E11, E21 E31 and E41 of each liquid crystal cell and the extension direction of the pattern of the second electrodes E12, E22, E32 and E42 on XY coordinate plane in the case where the extension direction ED1 of the pattern of the first electrode E11 of the first liquid crystal cell 10 is inclined by 2° with respect to the X-axis (angle $\theta_1=2°$) and the extension direction ED2 of the pattern of the second electrode E12 is inclined by 89° with respect to the X-axis (angle $\theta_2=89°$) are shown in the following Table 1

TABLE 1

| | Angle (°) with the X-axis | $\theta_1 = 2°$, $\theta_2 = 89°$ |
|---|---|---|
| First electrodes E11 | $\theta_1$ | 2 |
| Second electrodes E12 | $\theta_2$ | 89 |
| Second electrodes E22 | $180 - \theta_2$ | 91 |
| First electrodes E21 | $-\theta_1$ | -2 |
| First electrodes E31 | $90 + \theta_1$ | 92 |
| Second electrodes E32 | $90 + \theta_2$ | 179 |
| Second electrodes E42 | $270 - \theta_2$ | 181 |
| First electrodes E41 | $90 - \theta_1$ | 88 |

In addition, in Modification 2 described above, the second substrates S12 and S22 of the first liquid crystal cell 10 and the second liquid crystal cell 20 are arranged so as to face each other via the first transparent adhesive layer TA1, and similarly, the second substrates S32 and S42 of the third liquid crystal cell 30 and the fourth liquid crystal cell 40 are arranged so as to face each other via the third transparent adhesive layer TA3, and further, the third liquid crystal cell 30 and the fourth liquid crystal cell 40 are rotated by 90±10° with respect to the first liquid crystal cell 10 and the second liquid crystal cell 20, and the first substrates S21 and S31 of the second liquid crystal cell 20 and the third liquid crystal cell face each other via the second transparent adhesive layer TA2. However, this is an example, and an arrangement of each liquid crystal cell is not limited thereto. For example, the second liquid crystal cell 20 may be arranged in a state of being rotated in a range of 90±10° with respect to the first liquid crystal cell 10, the third liquid crystal cell 30 may be arranged in a state of being rotated in a range of 90±10° with respect to the second liquid crystal cell 20, and the fourth liquid crystal cell 40 may be arranged in a state of being rotated in a range of 90±10° with respect to the third liquid crystal cell 30. In this case, it is preferable to adjust the angle between the extension directions of the electrodes and the X-axis and/or the Y-axis so that the extension directions of the first electrodes E11, E21, E31 and E41 and the second electrodes E12, E22, E32 and E42 in the first liquid crystal cell 10, the second liquid crystal cell 20, the third liquid crystal cell 30 and the fourth liquid crystal cell 40 are not in the same direction. As a result, it is possible to prevent the electrode patterns from overlapping each other in a state in which the electrode patterns are completely matched, thereby prevent interference and reduce the occurrence of moire.

Modification 3

In the embodiment described above, the electrodes arranged on the two substrates in each liquid crystal cell each have the same pattern, and an extension direction of the pattern is inclined at a predetermined angle with respect to the X-axis or the Y-axis. However, the electrodes arranged on one of the two substrates in each liquid crystal cell may extend in a direction parallel to the X-axis or the Y-axis. Further, the electrode arranged on one substrate may be arranged on substantially an entire surface of the one substrate so as to overlap all of the electrode patterns arranged on the opposing substrate.

What is claimed is:

1. An optical device comprising:
   a first liquid crystal cell; and
   a second liquid crystal cell overlapped with the first liquid crystal cell;
   wherein each of the first liquid crystal cell and the second liquid crystal cell includes:
      a first substrate arranged with a first electrode having a first pattern extending in a direction inclined at a predetermined angle with respect to a first direction;
      a second substrate arranged with a second electrode having a second pattern extending in a direction inclined at a predetermined angle with respect to a second direction perpendicular to the first direction;
      a first alignment film arranged on the first electrode;
      a second alignment film arranged on the second electrode; and
      a liquid crystal layer between the first substrate and the second substrate,
   wherein an extension direction of the first pattern of the first electrode and an extension direction of the second pattern of the second electrode intersect each other without being perpendicular,
   wherein the first substrate and the second substrate are arranged with the first electrode and the second electrode facing each other,
   wherein the first pattern of the first electrode and the second pattern of the second electrode overlap in a plan view,
   wherein the extension direction of the first pattern of the first electrode in the first liquid crystal cell and the extension direction of the first pattern of the first electrode in the second liquid crystal cell are different from each other, and the extension direction of the second pattern of the second electrode in the first liquid crystal cell and the extension direction of the second pattern of the second electrode in the second liquid crystal cell are different from each other,
   wherein an alignment direction of the first alignment film is perpendicular to the first direction and an alignment direction of the second alignment film is perpendicular to the second direction, and
   wherein the alignment direction of the first alignment film intersects so as not to be perpendicular to the extension direction of the first pattern of the first electrode and the alignment direction of the second alignment film intersects so as not to be perpendicular to the extension direction of the second pattern of the second electrode.

2. The optical device according to claim 1, wherein the first substrate and the second substrate have a rectangular shape with a pair of first sides parallel to the first direction and a pair of second sides parallel to the second direction in each of the first liquid crystal cell and the second liquid crystal cell.

3. The optical device according to claim 1, wherein the predetermined angle is 0.5° or more and 10° or less.

4. The optical device according to claim 1, wherein a shape of the first pattern and a shape of the second pattern are linear.

5. The optical device according to claim 1, wherein a shape of the first pattern and a shape of the second pattern are zig-zag shape.

6. The optical device according to claim 5, wherein each of the first pattern and the second pattern has a first bend, a second bend adjacent to the first bend, and a third bend adjacent to the first bend, and a first distance between the first bend and the second bend is not the same as a second distance between the first bend and the third bend.

7. The optical device according to claim 1, wherein the first crystal cell and the second crystal cell are overlapped with the second substrate of the first crystal cell and the second substrate of the second crystal cell facing each other.

8. The optical device according to claim 1, wherein the first liquid crystal cell and the second liquid crystal cell are overlapped so that they are displaced by 90° from each other.

9. The optical device according to claim 1, wherein the second substrate of the first liquid crystal cell and the second substrate of the second liquid crystal cell are overlapped so that they are displaced by 180° from each other.

10. The optical device according to claim 1, wherein an orientation direction of a liquid crystal in the liquid crystal layer is not perpendicular to the extension direction of the first pattern and the extension direction of the second pattern of the second electrode in each of the first liquid crystal cell and the second liquid crystal cell.

11. The optical device according to claim 1, further comprising:
a third liquid crystal cell overlapped with the second liquid crystal cell; and
a fourth liquid crystal cell overlapped with the third liquid crystal cell,
wherein each of the third liquid crystal cell and the fourth liquid crystal cell includes:
a first substrate arranged with a first electrode having a first pattern extending in a direction inclined at a predetermined angle with respect to the second direction;
a second substrate arranged with a second electrode having a second pattern extending in a direction inclined at a predetermined angle with respect to the first direction; and
a liquid crystal layer between the first substrate and the second substrate,
wherein an extension direction of the first pattern of the first electrode and an extension direction of the second pattern of the second electrode intersect each other without being perpendicular,
wherein the first substrate and the second substrate are arranged with the extension direction of the first pattern of the first electrode and the extension direction of the second pattern of the second electrode intersecting each other without being perpendicular and the first electrode and the second electrode facing each other, and
wherein the first pattern of the first electrode in the first liquid crystal cell, the second liquid crystal cell, the third liquid crystal cell and the fourth liquid crystal cell are different from each other, and the extension direction of the second pattern of the second electrode in the first liquid crystal cell, the extension direction of the second pattern of the second electrode in the second liquid crystal cell, the extension direction of the second pattern of the second electrode in the third liquid crystal cell, and the extension direction of the second pattern of the second electrode in the fourth liquid crystal cell are different from each other.

12. The optical device according to claim 1, wherein the first pattern includes two branch electrodes adjacent to each other, and the two branch electrodes generate a lateral electric field.

13. An optical device comprising:
a first liquid crystal cell; and
a second liquid crystal cell overlapped with the first liquid crystal cell;
wherein each of the first liquid crystal cell and the second liquid crystal cell includes:
a first substrate arranged with a plurality of first electrodes having a first pattern having a first bending point;
a second substrate arranged with a plurality of second electrodes having a second pattern having a second bending point;
a first alignment film arranged on the first electrode;
a second alignment film arranged on the second electrode; and
a liquid crystal layer between the first substrate and the second substrate,
wherein the plurality of first electrodes is arranged with the alignment direction of the first bending point inclined at a predetermined angle to the first direction,
wherein the plurality of second electrodes is arranged with the alignment direction of the second bending point inclined at a predetermined angle with respect to a second direction perpendicular to the first direction,
wherein the arrangement direction of the first bending point and the arrangement direction of the second bending point intersect without being perpendicular,
wherein the first substrate and the second substrate are arranged with the first electrode and the second electrode facing each other,
wherein the plurality of first electrodes and the plurality of second electrodes overlap in a plan view,
wherein the arrangement direction of the first bend point in the first liquid crystal cell and the arrangement direction of the first bend point in the second liquid crystal cell are different from each other, and the arrangement direction of the second bend point in the first liquid crystal cell and the arrangement direction of the second bend point in the second liquid crystal cell are different from each other,
wherein an alignment direction of the first alignment film is perpendicular to the first direction and an alignment direction of the second alignment film is perpendicular to the second direction, and
wherein the alignment direction of the first alignment film intersects so as not to be perpendicular to the arrangement direction of the first bend point in the first liquid crystal cell and the arrangement direction of the first bend point in the second liquid crystal cell and the alignment direction of the second alignment film intersects so as not to be perpendicular to the arrangement direction of the second bend point in the first liquid crystal cell and the arrangement direction of the second bend point in the second liquid crystal cell.

14. The optical device according to claim 13, wherein, in the plurality of first electrodes, a first distance between the first bend point and one end of the first electrode and a second distance between the first bend point and the other end of the first electrode are different, and,
in the plurality of second electrodes, a third distance between the second bend point and one end of the second electrode and a fourth distance between the second bend point and the other end of the second electrode are different.

15. The optical device according to claim 13, wherein two first electrodes adjacent to each other generate a lateral electric field.

* * * * *